United States Patent [19]

Yoshimura

[11] Patent Number: 5,063,455
[45] Date of Patent: Nov. 5, 1991

[54] MODE SELECTING MECHANISM FOR A TAPE RECORDER

[75] Inventor: Toshio Yoshimura, Kanagawa, Japan

[73] Assignee: Tanashin Denki Co., Ltd., Tokyo, Japan

[21] Appl. No.: 410,908

[22] Filed: Sep. 22, 1989

[30] Foreign Application Priority Data

Feb. 7, 1989 [JP] Japan .................... 1-13339[U]

[51] Int. Cl.⁵ ............................................. G11B 15/18
[52] U.S. Cl. ................................. 360/96.5; 360/96.1
[58] Field of Search ............... 360/96.5, 95, 90, 96.1, 360/137

[56] References Cited

U.S. PATENT DOCUMENTS

| | | | |
|---|---|---|---|
| 4,612,591 | 9/1986 | Tanaka et al. | 360/96.5 X |
| 4,792,871 | 12/1988 | Hütter | 360/95 |
| 4,884,153 | 11/1989 | Ahn | 360/95 |
| 4,885,648 | 12/1989 | Yoshimura | 360/96.5 |

Primary Examiner—David J. Severin
Attorney, Agent, or Firm—Lieberman Rudolph & Nowak

[57] ABSTRACT

Tape recorder able to actuate a plurality of mechanisms, such as an ejector mechanism, a head moving mechanism, and a high-speed rotation transmission mechanism, by the turning force of the motor for transporting tape. The cam gear is rotatable by the motor for transporting tape, a rocking lever is engaged with the cam gear, and an electromagnet for EJECT motion, an ejector mechanism connected operatively to the rocking lever by the electromagnet for EJECT motion, an electromagnet for PLAY motion, and a head moving mechanism connected operatively to the rocking lever by the electromagnet for PLAY motion are also provided. The turning force of the motor is transmitted to the ejector mechanism, or the head moving mechanism through the cam gear and the rocking lever. Another tape recorder includes a cam gear, a rocking lever, a head moving mechanism, electromagnets for PLAY, FAST FORWARD and REWIND motion, a member for changing the traveling direction of tape connected operatively to the electromagnets for FAST FORWARD and REWIND motion, a rotatable member supported rotatably to the member for changing the traveling direction of tape, and a high-speed rotation transmission mechanism connected operatively to the rotatable member. The turning force of the motor is transmitted to the head moving mechanism through the cam gear and the rocking lever, and also to the high-speed rotation mechanism through the head moving mechanism and the rotatable member.

2 Claims, 17 Drawing Sheets

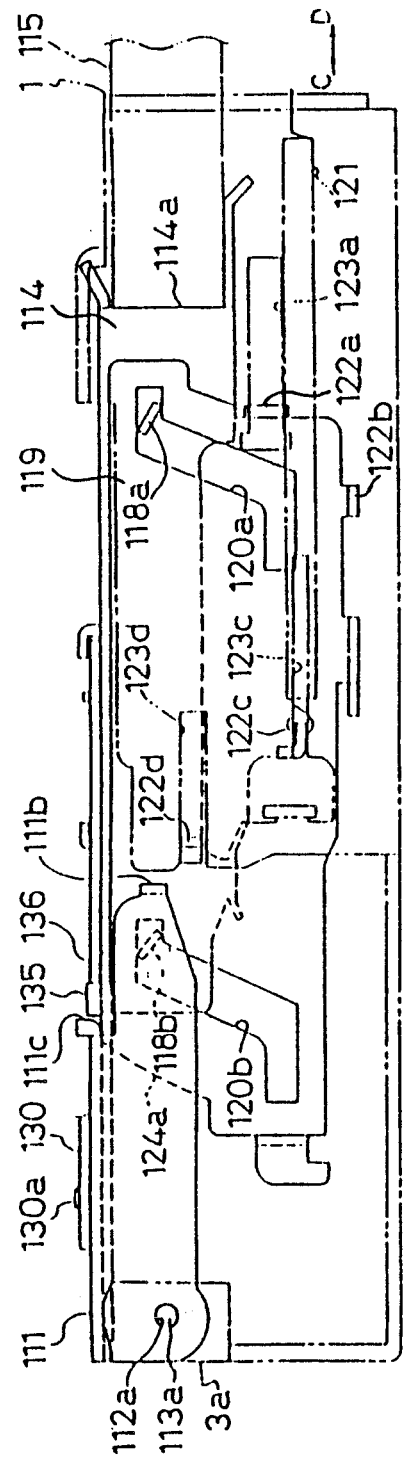

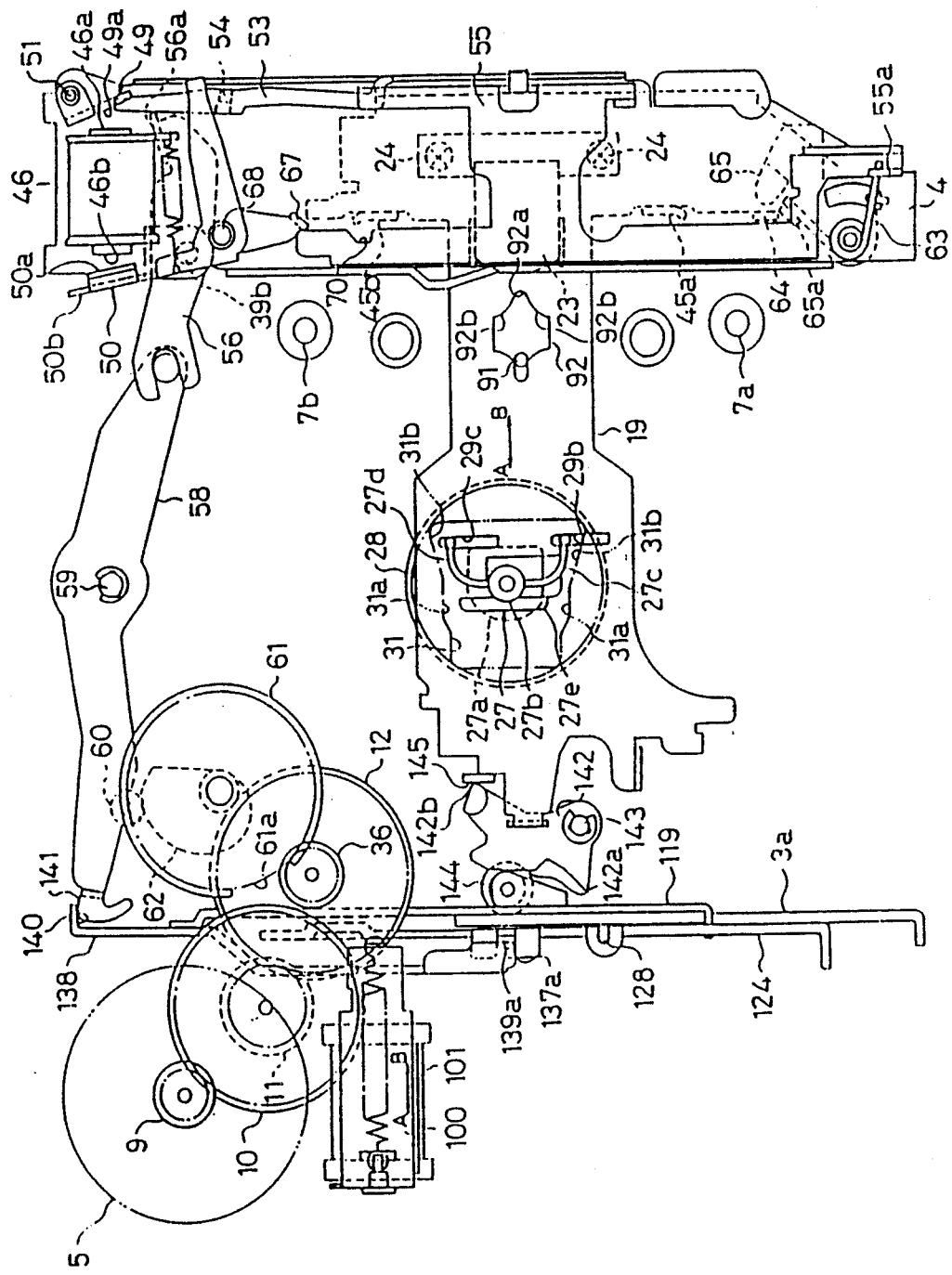

MODE SELECTING MECHANISM FOR A TAPE RECORDER

TECHNICAL FIELD

The present invention relates generally to a tape recorder, and more particularly, to an improved tape recorder which is able to actuate a plurality of mechanisms including an ejector mechanism, a head moving mechanism and a high-speed rotation transmission mechanism by making use of the turning force of the motor for transporting tape.

BACKGROUND OF THE INVENTION

A tape recorder technique for actuating a single means, such as an ejector mechanism and a head moving mechanism, by using the turning force of the motor for transporting tape is well known in the art. For example, Japanese Patent Application Laid Open No. 60-229265 discloses a tape recorder designed so as to actuate only the ejector mechanism by making use of the turning force of the motor for transporting tape, and Japanese Patent Application Laid Open No. 61-74163 discloses a tape recorder designed so as to actuate only the head moving mechanism by making use of the turning force of the motor for transporting tape.

However, such conventional tape recorders are not designed to actuate both the ejector mechanism and the head moving mechanism by making use of the turning force of the motor for transporting tape. By combining two mechanisms of such conventional tape recorders for the purpose of actuating both the ejector mechanism and the head moving mechanism by employing the turning force of the motor for transporting tape, construction of the tape recorder (is complicated) due to the complexity of each mecahnism of the conventional tape recorders.

SUMMARY OF THE INVENTION

It is one object of the present invention to provide an improved tape recorder having a more simple construction than that of conventional tape recorders having mechanisms designed to actuate both the ejector mechanism and the head moving mechanism by utilizing the turning force of the motor for transporting tape.

Another object of the present invention is to provide an improved tape recorder having a simple construction in which the motor for transporting tape is able to actuate the head moving mechanism and a high-speed rotation transmission mechanism for rotating left-hand or right-hand reel support at a high-speed.

Accordingly, to accomplish these objects, the present invention provides an improved tape recorder which is able to actuate an ejector mechanism and a head moving mechanism by utilizing the turning force of the motor for transporting tape, comprising a cam gear rotatable by the motor for transporting tape and having a cam; a rocking lever engaged with said cam gear for performing the rocking motion; an electromagnet for EJECT motion, said ejector mechanism connected operatively to said rocking lever by means of said electromagnet for EJECT motion, and being able to be actuated by said rocking lever; an electromagnet for PLAY motion, with said head moving mechanism connected operatively to said rocking lever by said electromagnet for PLAY motion, and being able to be actuated by said rocking lever. In this tape recorder, the turning force of the motor for transporting tape is transmitted to the ejector mechanism, or the head moving mechanism, through the cam gear and the rocking lever, thereby resulting in the motion of the ejector mechanism and the head moving mechanism.

Also, the present invention provides an improved tape recorder which is able to actuate a head moving mechanism and a high-speed rotation transmission mechanism by utilizing the turning force of the motor for transporting tape, comprising a cam gear rotatable by the motor for transporting tape and having a cam; a rocking lever engaged with said cam gear for performing the rocking motion; an electromagnet for PLAY motion; said head moving mechanism connected operatively to said rocking lever by means of said electromagnet for PLAY motion, and being able to be actuated by said rocking lever; an electromagnet for FAST FORWARD motion; an electromagnet for REWIND motion; a member for changing the traveling direction of tape connected operatively to said electromagnets for FAST FORWARD, and REWIND motion, and positioned normally in the neutral position to be able to travel into the position for FAST FORWARD, or REWIND motion by means of said electromagnet for FAST FORWARD, or REWIND motion; a rotatable member supported rotatably to said member for changing the traveling direction of tape so as to travel according to said position of said member, and thereby to rotate in the direction predetermined according to the traveled position thereof, by means of said head moving mechanism; and said high-speed rotation transmission mechanism connected operatively to said rotatable member for transmitting the turning force of the motor for transporting tape to one of two reel supports at high-speed. In this tape recorder, the turning force of the motor for transporting tape is transmitted to the head moving mechanism through the cam gear and the rocking lever, and also to the high-speed rotation transmission mechanism through the head moving mechanism and the rotatable member, thereby resulting in the motion of the head moving mechanism and the high-speed rotation transmission mechanism.

BRIEF DESCRIPTION OF THE DRAWINGS

The present invention will become more readily apparent from the following description of a preferred embodiment shown, by example only, in the accompayning drawings wherein:

FIGS. 14 to 17 are side elevation views of the components, as depicted in FIG. 11, illustrating the loading and ejecting motion of the tape cassette; and FIGS. 18 and 19 illustrate the EJECT operation of the tape recorder according to the present invention.

DETAILED DESCRIPTION OF THE INVENTION

Figure 1:
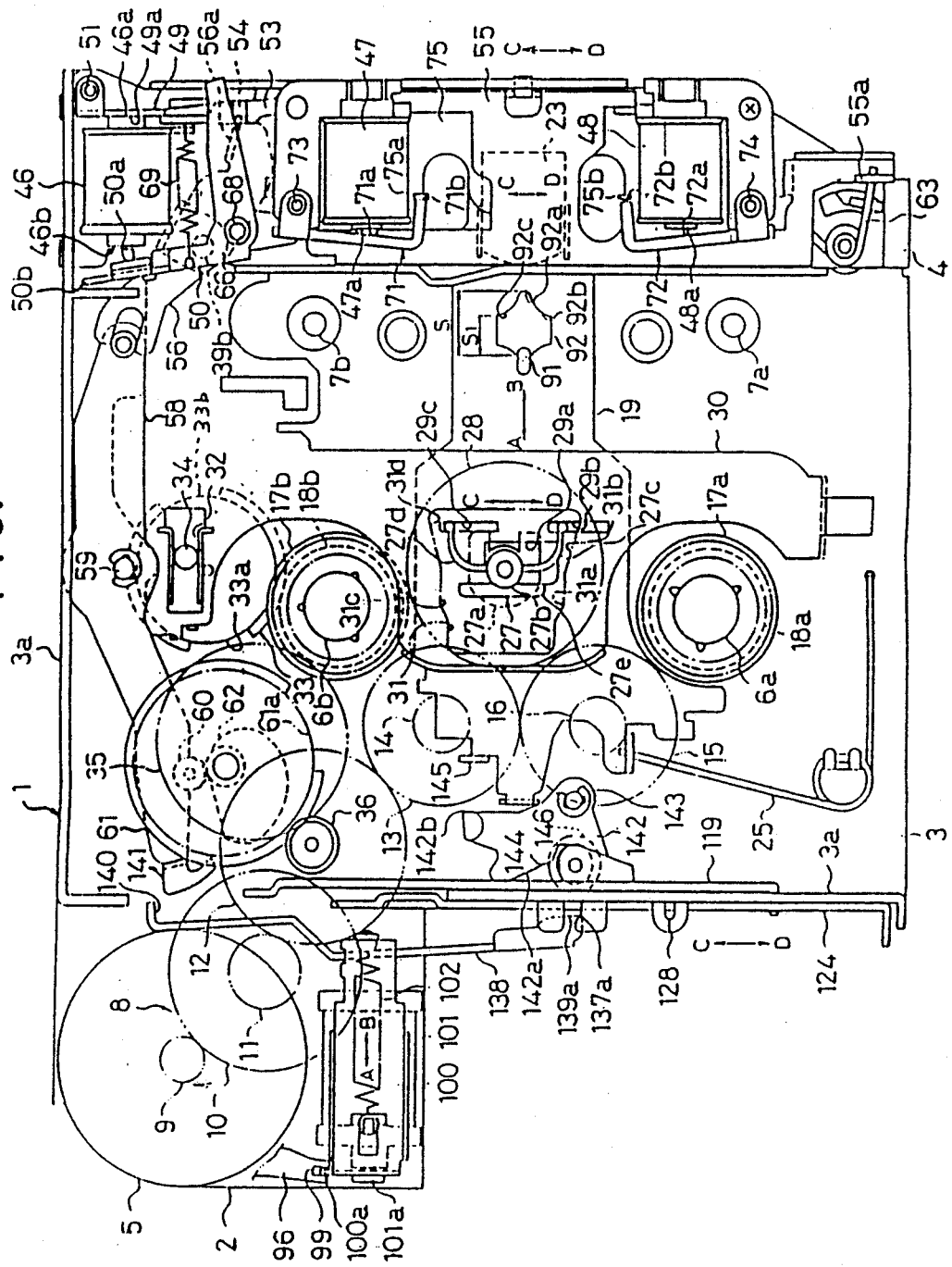
FIG. 1 is a top plan view of a tape recorder according to the present invention from which components for loading and ejecting the tape cassette are removed, and which is illustrated in the stationary position.
Figure 4:
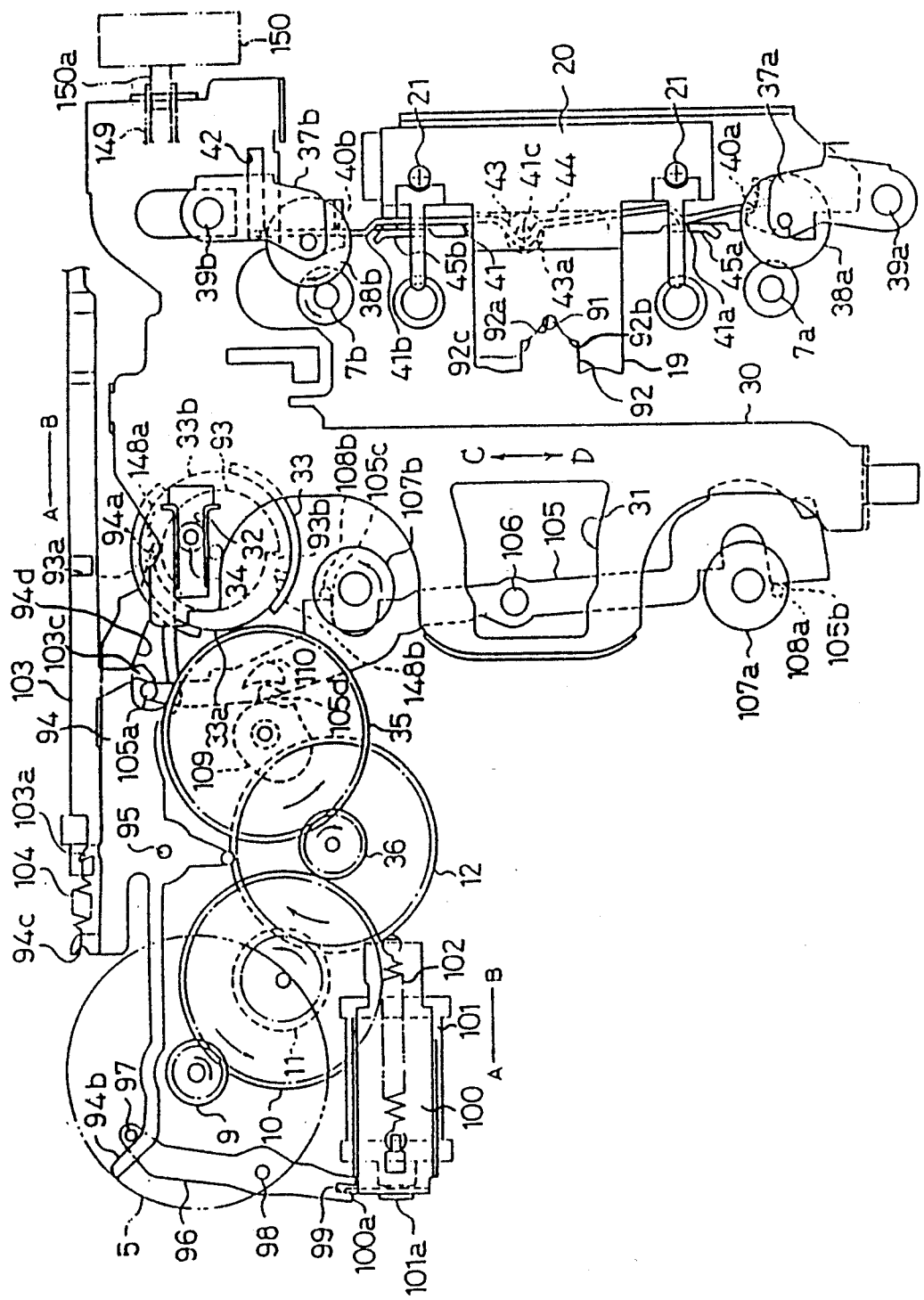
Figure 5:
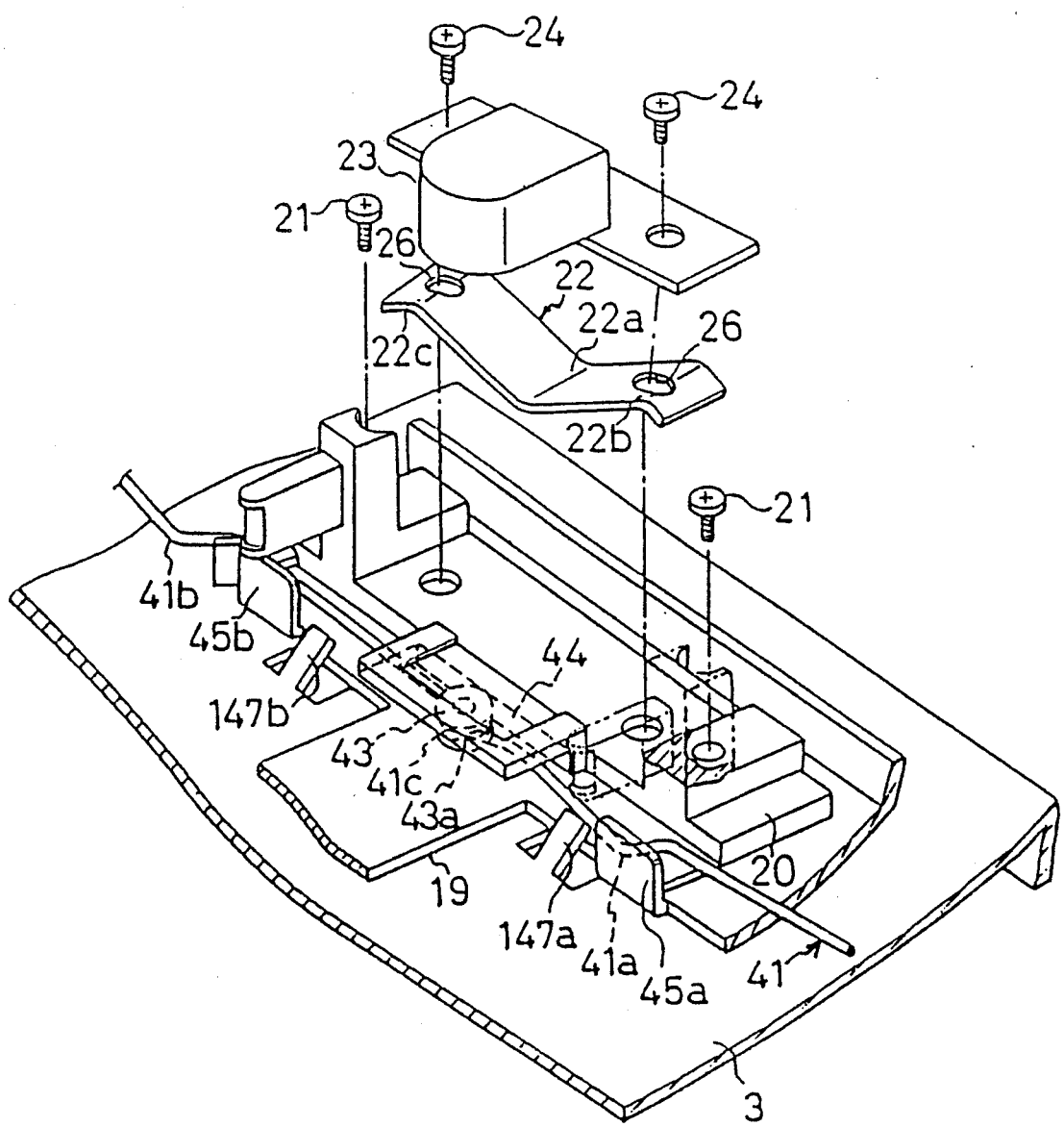
FIG. 5 is an exploded perspective view illustrating the connection relation between a magnetic head and a head-mounting plate.

One preferred embodiment of the present invention will now be described with reference to the accompanying drawings. FIG. 1 is a top plan view of a tape recorder according to the present invention from which components for loading and ejecting the tape cassette are removed, and which is illustrated in the stationary position. In FIG. 1, a base plate assembly, shown generally as 1, comprises a main plate 3 which a wall 2 is protruded from one side edge (the left-hand edge in FIG. 1) thereof, and an elongated, auxiliary plate 4 which is disposed on, and spaced from the upper suface of the main plate 3 at the other side edge (the right-hand edge in FIG. 1) thereof. The motor for transporting tape 5 is disposed on the upper surface of the protruded wall 2, and a pair of reel supports 6a and 6b and a pair of capstan shafts 7a and 7b are disposed on the upper surface of the main plate 3. The turning force of the motor 5 is transmitted to each of reel supports 6a and 6b and each of capstan shafts 7a and 7b, respectively, through a gear-driven rotation transmission mechanism 8 and a belt-driven rotation transmission mechanism (not shown). The gear-driven rotation transmission mechanism 8 have a first gear 9 mounted on a shaft of the motor 5, a second gear 10 engaging with the first gear 9, a third gear 11 turning coaxially together with the second gear 10, a fouth gear 12 engaging with the third gear 11, a fifth gear 13 engaging with the fourth gear 12, a sixth gear 14 turning coaxially together with the fifth gear 13, a seventh gear 15 engaging with the fifth gear 13, an eighth gear 16 turning coaxially together with the seventh gear 15, and reel gears for low-speed rotation and high-speed rotation 17a, 17b, 18a, and 18b, respectively, turning coaxially together with respective associated reel supports 6a and 6b. In the PLAY operation, a change gear for low-speed rotation 28, as will be described herein, is selectively traveled in one position which it engages with the eighth gear 16 and the reel gear for low-speed rotation 17a on the side of the reel support 6a (the downward side in FIG. 1), or the other position which it engages with the sixth gear 14 and the reel gear for low-speed rotation 17b on the side of the reel support 6b (the upward side in FIG. 1), thereby resulting in the low-speed (normal-speed) rotation of each of the reel supports 6a and 6b. Also, in the FAST FORWARD (F.F.), or REWIND (REW) operation, a change gear for high-speed rotation 90, as will be described herein, is selectively traveled in one position which it engages with the seventh gear 15 and the reel gear for high-speed rotation 18a on the side of the reel support 6a, or the other position which it engages with the fifth gear 13 and the reel gear for high-speed rotation 18b on the side of the reel support 6b, thereby resulting in the high-speed rotation of each of the reel supports 6a and 6b. A head-mounting plate 19 which is able to travel in the direction of arrows A and B (the left-hand and right-hand direction in FIG. 1) is disposed on the upper surface of the main plate 3. Mounted on the upper surface of one end (the right-hand end in FIG. 1) of the head-mounting plate 19, as shown in FIGS. 4 and 5, is a tape guide 20 of material such as the synthetic resin. A magnetic head 23 is fixed on a leaf spring 22 above upper surface of the tape guide 20 by means of screw means 24. When the head-mounting plate 19 is moved in the direction of arrow A and reaches the position for PLAY motion, the magnetic head 23 will make contact with a tape 115b of a tape cassette 115, as will be described herein. A head-return spring 25, as shown in FIG. 1, urges the head-mounting plate 19 toward the direction of arrow B, i.e., the direction for returning the magnetic head 23. As shown in FIG. 5, the leaf spring 22 has a V-shaped bend at the middle thereof, and reverse V-shaped bends 22b and 22c at the opposite ends thereof. Drilled on the reverse of V-shaped bends 22b and 22c are openings 26 for inserting screw means 24. The fastening adjustment of screw means 24 allows the azimuth angle of the magnetic head 24 to be adjusted.

Thus, with the leaf spring 22, the magnetic head 24 can be azimuth-adjusted so that one side edge thereof will be on the same level with the other side edge thereof. The change gear for low-speed rotation 28 is supported rotatably on the under surface of the other end (the left-hand end in FIG. 1) of the head-mounting plate 19 by a support member 21. Furthermore, the change gear 28 can be moved in the direction perpendicular to the traveling direction of the head-mounting plate 19 (the direction of arrows C and D in FIG. 1). The support member 27 of the material, such as the synthetic resin, comprises a plate-shaped main body 27a, a cylindrical, single shaft 27b projecting integrally from the upper surface of the main body 27a at the middle thereof, slender pieces 27c and 27d, and a support piece 27e. The slender pieces 27c and 27d and the support piece 27e are projected integrally from the circumferential surface of the cylindrical shaft 27b at the three side portions thereof (the left-hand, upward, and downward side portions in FIG. 1), respectively. The cylindrical shaft 27b is mounted movably on a first opening 29a of the head-mounting plate 19, whereas the slender pieces 27c and 27d at the free end thereof is mounted movably on second and third openings 29b and 29c of the head-mounting plate 19, respectively, A portion of the head-mounting plate 19 is supported cooperatively between the main body 27a and the support piece 27e, and the support piece 27e which is positioned on the side of the upper surface of the head-mounting plate 19 together with the slender pieces 27c and 27d is situated within a guide opening 31 of a transport plate 30. The transport plate 39 is mounted on the upper surface of the main plate 3 to be able to travel in the direction perpendicular to the traveling direction of the head-mounting plate 19 (the direction of arrows C and D in FIG. 1). Engaged with a engaging opening 32 of the tansport plate 30 is a engaging pin 34 which is projected eccentrically from the upper surface of a partial toothed gear 33.

The partial toothed gear 33 has two non-toothed sections 33a and 33b which are spaced at intervals of an angle of 180°, and turns on an axis which is supported on the under surface of the main plate 3. The partial toothed gear 33 is engaged with a first cam gear 35 which is, in turn, engaged with a small diameter gear 36 enabling to be turned coaxially together with the fourth gear 12 of the gear-driven rotation transmission mechanism 8. Thus, when the partial toothed gear 33 is rotated clockwise 180°, the transport plate 30 is moved in the direction of arrow D from the beginning position (the position shown in FIG. 1) thereof, and when the partial toothed gear 33 is again rotated clockwise 180°, the transport plate 30 is moved in the direction of arrow C. In case where the transport plate 30 is positioned in the beginning position (the position shown in FIG. 1), when the head-mounting plate 19 travels in the direction of arrow A to reach the positon for PLAY motion thereby allowing the free end of the slender piece 27c to make contact with a guide edge 31a and an inclined edge 31b of the guide opening 31, the change gear for low-speed rotation 28 will be moved in the direction of arrow C together with the support member 27 and engaged with the sixth gear 14 of the gear-driven rotation transmission mechanism 8 and the reel gear for low-speed rotation 17b on the side of the reel support 6b. To the contrary, in case that the transport plate 30 is positioned in the traveled position of the direction of arrow D, when the head mounting plate 19 travels in the direction of arrow A to allow the free end of the slender piece 27d to be made contact with a guide edge 31c and an inclined edge 31d of the guide opening 31, the change gear for low-speed rotation 28 will be moved in the direction of arrow D together with the support member 27 and engaged with the eighth gear 16 of the gear-driven rotation transmission mechanism 8 and the reel gear for low-speed rotation 17a on the side of the reel support 6a.

Pinch rollers 38a and 38b are respectively disposed on the upper surface of the main plate 3 corresponding to respective capstan shafts 7a and 7b by means of respective pinch roller arms 37a and 37b, as shown in FIG. 4. Each of the pinch rollers 38a and 38b is supported rotatably on mounting shafts 39a and 39b at the upper surface of the main plate 3.

A rod-shaped spring 41 at one end thereof is hung to a spring support 40a of the pinch roller arm 37a, and at the other end thereof supported on an elongated opening 42 of the transport plate 30 through a spring support 40b of the pinch roller arm 37b. The rod-shaped spring 41 has contact bends 41a and 41b at the opposite ends thereof and a roller-engaging bent 41c at the middle thereof. As shown in FIG. 5, the roller-engaging bend 41c is engaged with an annular groove 43a of a flat roller 43 so that the roller 43 can be held rotatably on the middle of the rod-shaped spring 41. The roller 43 comes in contact with a vertical guide surface 44 which is formed integrally with the tape guide 20. This roller 43 allows the rod-shaped spring 41 to be traveled smoothly in the direction of arrows C and D. The rod-shaped spring 41 travels together with the transport plate 30 and the head-mounting plate 19. Thus, when the transport plate 30 travels in the direction of arrow C, the contact bend 41a of the rod-shapped spring 41 makes contact with a guide piece 45a which is projected from the head-mounting plate 19.

To the contrary, when the transport plate 30 travels in the direction of arrow D, the contact bend 41b of the rod-shaped spring 41 makes contact with a guide piece 45b.

Also, when the transport plate 30 travels in the direction of arrow C while the head-mounting plate 19 travels in the direction of arrow A and then positioning in the position for PLAY motion, the rod-shaped spring 41 will separates the pinch roller 30a from the capstan shaft 7a and presses the pinch roller 38b on the capstan shaft 7b (see FIG. 4). To the contrary, when the transport plate 30 travels in the direction of arrow D while the head-mounting plate 19 was positioning in the position for PLAY motion, the rod-shaped spring 41 will presses the pinch roller 38a on the capstan shaft 7a and separates the pinch roller 38b from the capstan shaft 7b. Disposed on the upper surface on the auxiliary plate 4 which is spaced upwardly from the main plate 3 are an electromagnet for PLAY motion 46, an electromagnet for REWIND motion 47, and an electromagnet for FAST FORWARD motion 48. The electromagnet for PLAY motion 46 can be turned on, when the tape cassette 115 is loaded in place, and has attraction portions 46a and 46b at the opposite ends thereof. The attraction portions 46a and 46b can attract and attach a portion 49a of the first armature 49 and a portion 50a of a second armature 50.

Figure 2:
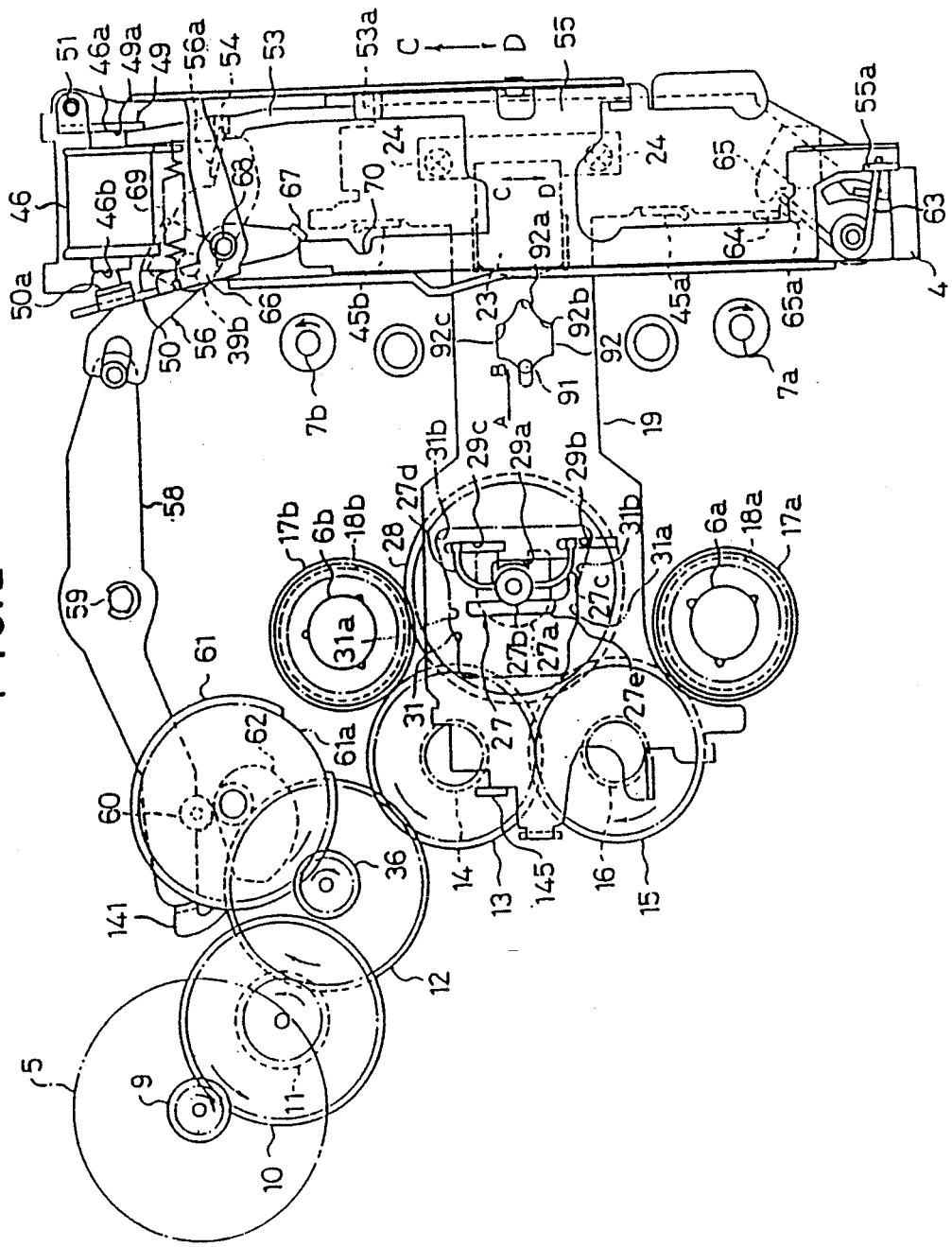
FIGS. 2 to 4 illustrate the PLAY operation of the tape recorder according to the present invention.
Figure 3:
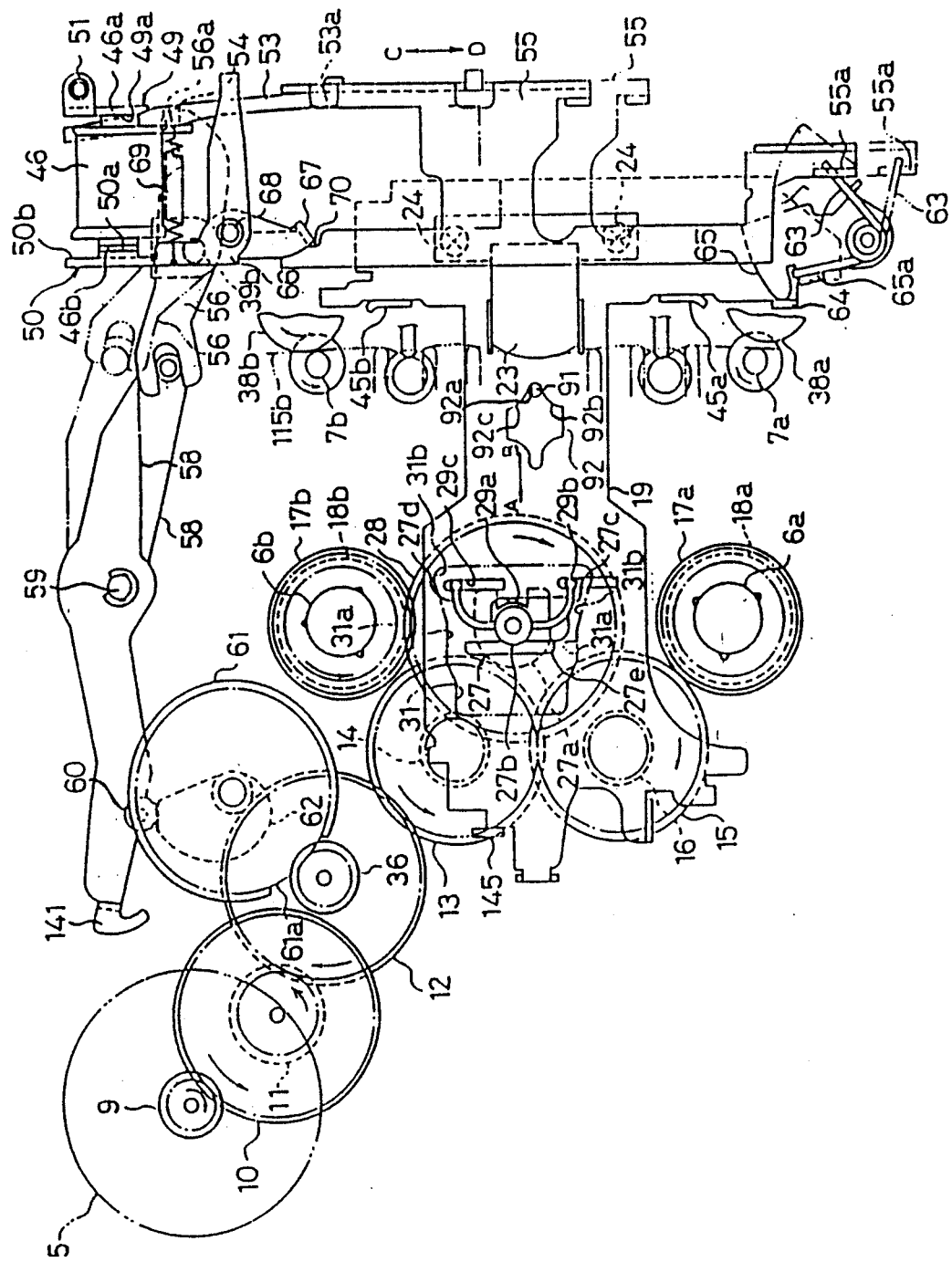

The first armature 49 which is supported rotatably on the mounting shaft 51 of the auxiliary plate 4 assumes the form of flat plate having the portion 49a to be attracted at the center thereof. The first armature 49 is biased toward the attraction direction (the clockwise direction in FIG. 1) by means of a return spring 52 (see FIG. 8). The first armature 49 at one end thereof is made contact with the top end of the rotatable lever 53. The rotatable lever 53 has a latch groove 54 at the middle thereof. The rotatable lever 53 at the base end 53a thereof is supported rotatably on one end of a slide lever 55 so as to be able to slide in the direction perpendicular to the traveling direction of the head-mounting plate 19(the direction of arrow C and D) together with the slide lever 55, as shown in FIG. 2 and 3.

As shown in FIG. 1, the slide lever 55 is mounted on the upper surface of the auxiliary plate 4 to slide in the direction of arrows C and D. When the electromagnet for PLAY motion attracts the first armature 49, a latch piece 56a on one end of a pull arm 56 is inserted in and latched on the latch groove 54 of the rotatable lever 53, as shown in FIG. 2. The pull arm 56 at the middle thereof is supported rotatably on the under surface of the auxiliary plate 4 by means of the mounting shaft 39a of the pinch roller arm 37b. The other end of the pull arm 56 is connected rotatably to one end of a rocking lever 58.

The rocking lever 58 at the middle thereof is supported on the upper surface of the main plate 3 by means of the mounting shaft 59. The other end of the rocking lever 58 makes contact with a cam 62 of a second cam gear 61 through a cam roller 60 which is disposed rotatably on the rocking lever 58, as shown in FIGS. 2 and 3.

The second cam gear 61 has a non-toothed section 61a. The second cam gear 61 is engaged with the small diameter gear 36. As the second cam gear 61 is rotated counterclockwise, the rocking lever 58 is rotated clockwise by means of the cam 62 of the cam gear 61. Then, the pull arm 56 is rotated counterclockwise and therefore the slide lever 55 is slid in the direction of arrow C by means of the rotatable lever 53 which the latch piece 56a on one end of the pull arm 56 is inserted in and latched on the latch groove 54 thereof. Together with sliding of the slide lever 55, the head-mounting plate 19 is pressed in the direction of the arrow A by means of a head-extrusion spring 63. The head-extrusion spring 63 at one end thereof is supported on a spring contact portion 55a of the slide lever 55, and the other end thereof supported on a spring contact portion 65a of a press member 65 which is able to press the portion 64 of the head-mounting plate 19. Typically, the head moving mechanism comprises the head-mounting plate 19, the rotatable lever 53, the slide lever 55, the head extrusion spring 63 and the press member 65.

The second armature 50 is consisted of a L-shaped main body 66 which has a portion 50a to be attracted at one end thereof and a latch piece 67 at the middle thereof. The main body 66 at the middle thereof is turned on the mounting shaft 68 which is disposed on the upper surface of the auxiliary plate 4. The second armature 50 is urged toward the attraction direction (the clockwise direction in FIG. 1) by means of a return spring 69. In case that the slide lever 55 is slided in the direction of arrow C and then reached in place, when the electromagnet for the PLAY motion 46 attracts the second armature 50 and the latch piece 67 of the second armature 50 rests or latches on a latch groove 70, the slide lever 55 will be maintained in the slided position of the direction of arrow C (the position shown in FIG. 3). The slide lever 55 is biased toward the direction of arrow D by means of the head-extrusion spring 63.

Accordingly, when the electromagnet for PLAY motion 46 is turned off, the slide lever will be slid and returned in the direction of arrow C by the force of the head-extrusion spring 63. The electromagnets 47 and 48, respectively, have attraction portions 47a and 48a at respective one end thereof. The attraction portions 47a and 48a can attract respective portions 71a and 72a of the third and fourth armatures 71 and 72, respectively. Each of the third and fourth armatures 71 and 72 assumes the L-shaped form and turns on respective mounting shafts 73 and 74 of the auxiliary plate 4. The third and fourth armatures 71 and 72, respectively, have portions 71a and 72a to be attracted at respective middle thereof. Thus, when the electromagnet for REWIND motion 47 attracts the third armature 71, a press end 71b of the third armature 71 will rotate counterclockwise and make contact with one protuberance 75a of member for changing the traveling direction of tape 75 to press it. Also when the electromagnet for FAST FORWARD motion 48 attracts the fourth armature 72, a press end 72b of the fourth armature 72 will rotate clockwise and make contact with the other protuberance 75b of the member 75 to press it.

Figure 8:
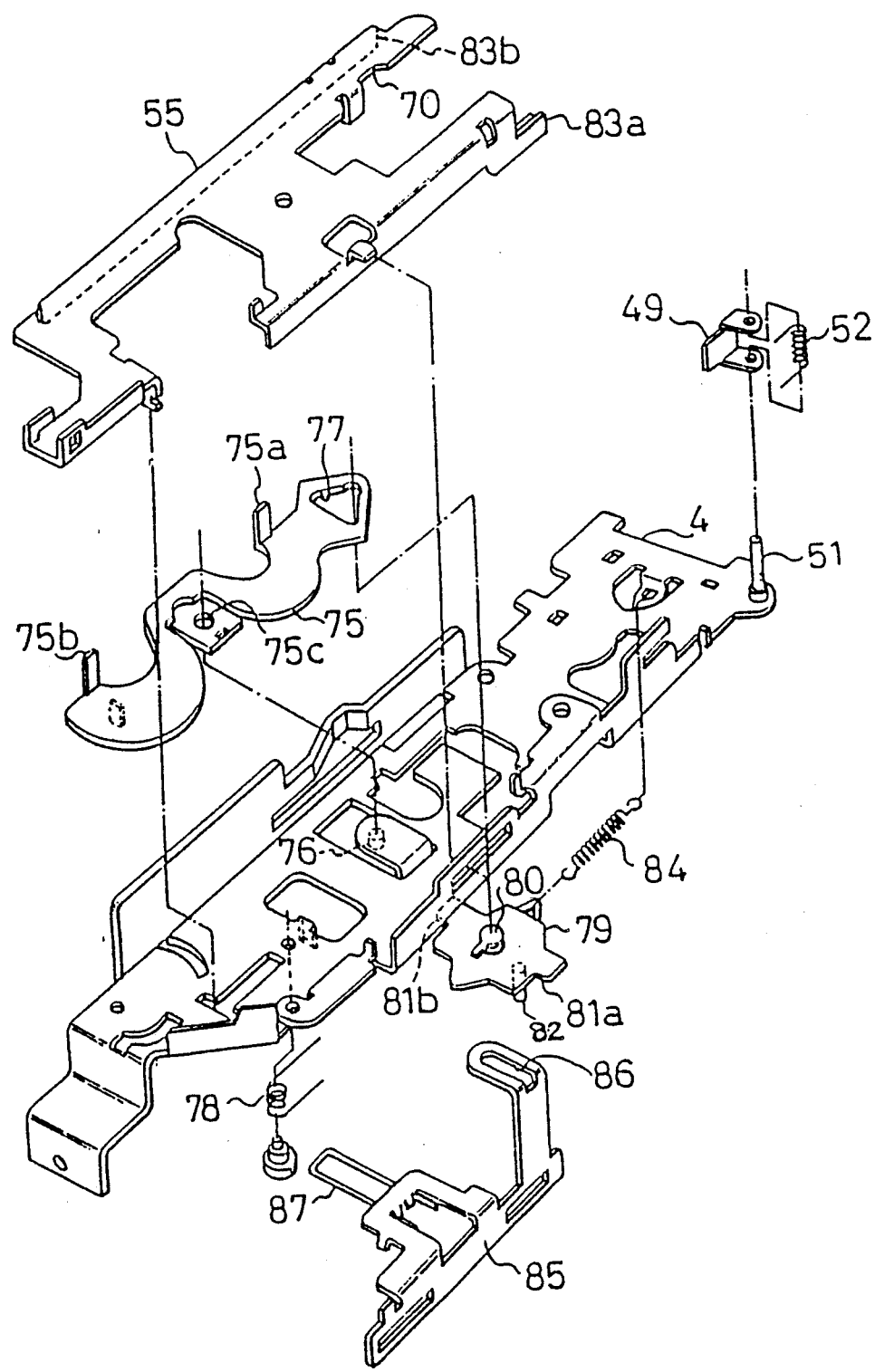
FIG. 8 is an exploded perspective view of a auxiliary plate and components related thereto.

As can be understood from FIG. 8, the member 75 is supported on a mounting shaft 76 of the auxiliary plate 4 by means of a mounting hole 75c so that one protuberance 75a can be rotated clockwise when it is pressed by the press end 71b of the third armature 71, and that the other protuberance 75b can be rotated counterclockwise when it is pressed by the press end 72b of the fourth armature 72. The protuberances 75a and 75b are projected, respectively, from the opposite ends of one side edge of the member 75. Punched on one end of the member 75 is a triangular matching opening 77. The member 75 is biased toward the neutral position by means of a return spring 78. A rotatable member 79 is supported rotatably on the member 75.

The rotatable member 79 has a support shaft 80, portions 81a and 81b to be pressed, and matching pin 82. The support shaft 80 is matched rotatably with the matching opening 77 of the member 75 so that the rotatably member 79 can be supported rotatably to the member 75.

Accordingly, as the member 75 rotates, the rotatable member 79 travels in same direction as the traveling direction of the head-mounting plate 19 (the direction of arrows A and B). Thus, when the member 75 for changing the traveling direction of tape is rotated clockwise to allow the rotatable member 79 to travel in one direction (the right-hand direction in FIG. 7), a pressing portion 83a on one side (the right-hand side in FIG. 7) of the slide lever 55 contacts with a portion 81a on one side (the right-hand side in FIG. 7) of the rotatable member 79 and travels in the direction of arrow C so that the rotatable member 79 will rotated counterclockwise (see FIG. 8). Also, when the member 75 is rotated counterclockwise to allow the rotatable member 78 to travel in the other direction (the left-hand direction in FIG. 7), a pressing portion 83b on the other side (the left-hand side in FIG. 7) of the slide lever 55 contacts with a portion 81b on the other side (the left-hand side in FIG. 7) of the rotatable member 79 and travels in the direction of arrow C so that the rotatable member 79 will be rotated clockwise. The rotatable member 79 is biased toward the neutral position by means of the return spring 84 (see FIG. 8). The matching pin 82 of the rotatable member 79 is matched with a matching opening 86 of a slide plate 85 which is mounted on the main plate 3 to slide in the direction of arrows C and D. Accordingly, as the rotatable member 79 rotates, the slide plate 85 slides in the direction of arrow C and D. Connected to the slide plate 85 through a coupling spring 87 is one end of a change lever for high-speed rotation 88.

Figure 7:
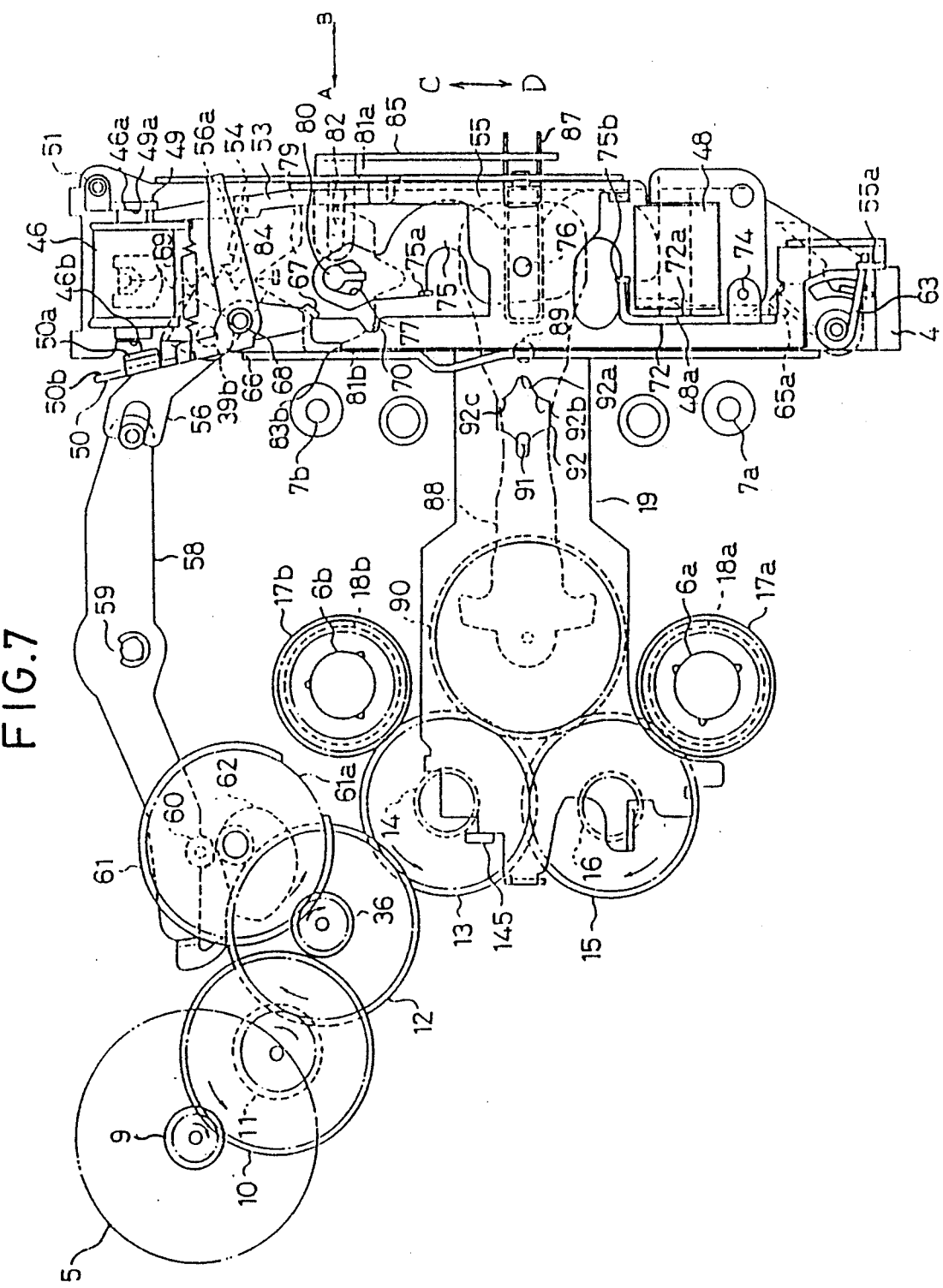
FIG. 7 shows the constrution of a high-speed rotation transmission mechanism.

The change lever for high-speed rotation 8 at the middle thereof is supported on the under surface of the main plate 3 by means of the mounting shaft 89, as shown in FIG. 7. The change gear for high-speed rotation 90 is supported rotatably on the other end of the change lever 88. Thus, when the slide plate 85 is slided in the direction of arrow C to allow the change lever for high-speed rotation 88 to be rotated counterclockwise, the change gear for high-speed rotation 90 is engaged with the seventh gear 15 of the gear-driven rotation transmission mechanism 8 and the reel gear for high-speed rotation 18a on the side of the reel support 6a, thereby resulting in the high-speed rotation of the reel support 6a. Also, when the slide plate 85 is slid in the direction of arrow D to allow the change lever 88 to be rotated clockwise, the change gear 90 is engaged with the fifth gear 13 of the gear-driven rotation transmission mechanism 8 and the reel gear 18b on the side of the reel support 6b, thereby resulting in the high-speed rotation of the reel support 6b.

The change lever for high-speed rotation 88 is positioned in the neutral position (the position in FIG. 7) except during the FAST FORWARD and REWIND operation so as to allow the change gear for high-speed rotation 90 not to be engaged with any other gears. The high-speed rotation transmission mechanism comprises the slide plate 85, the coupling spring 87, the change lever for high-speed rotation 88, and the change gear for high-speed rotation 90. The traveling stroke of the head-mounting plate 19 on the direction of arrow A is set to vary according as the change lever for high-sped rotation 88 positions in the neutral position, or rotates counterclockwise and clockwise.

Namely, the change lever for high-speed rotation 88 has a stopper protuberance 91 which is engaged with the engaging opening 92 of the head-mounting plate 19. Accordingly, in the case where the change lever for high-speed rotation 88 is in the neutral position, the traveling of the head-mounting plate 19 on the direction of arrow A allows the stopper protuberance 91 to be engaged with a first, or central recess 92a of the engaging opening 92, thereby enabling the magnetic head 23 to be made contact with the tape of the tape cassette. At this time, the traveling stroke of the head-mounting plate 19 is S (shown in FIG. 1). In the case where the change lever for high-speed rotation 88 has rotated counterclockwise, or clockwise, the traveling of the head-mounting plate 19 on the direction of arrow A allows the stopper protuberance 91 to be made contact with second, or third contact portion 92b or 92c, thereby enabling the magnetic head 23 to be positioned in the state which is separated from the tape of the tape cassette. At this time, the traveling stroke of the head-mounting plate 19 is S1(<S).

Figure 6:
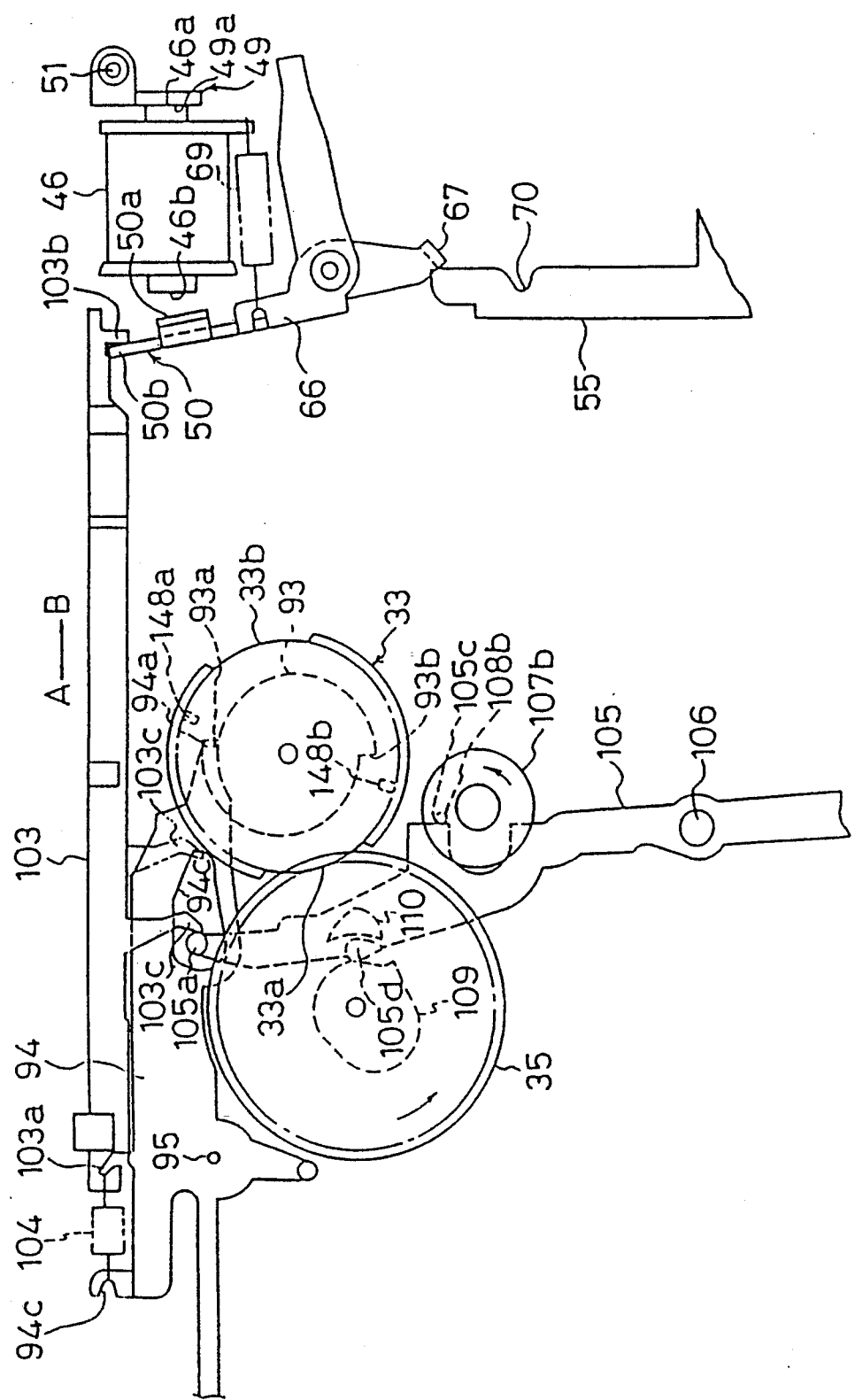
FIG. 6 illustrates the connection relation between a detector lever and a rocking arm.

Disposed on the under surface of the partial toothed gear 33 is a cam 93 having two latch ends 93a and 93b which are spaced at intervals of an angle of 180°, as shown in FIGS. 4 and 6. The latch ends 93a and 93b are selectively latched on a latch portion 94a on one end of a first trigger arm 94 to prevent the partial toothed gear 33 from rotating. The first trigger arm 94 at the middle thereof is supported on the main plate 3 by means of the mounting shaft 95.

As shown in FIG. 4, an inclined surface 94b on the other end of the first trigger arm 94 is made contact with a pin 97 which is projected from one end of a second trigger arm 96. The second trigger arm 96 at the middle thereof is supported rotatably on the main plate 3 by means of a mounting shaft 98. A latch recess 99 which is formed on the second trigger arm 96 receives, and latches on a projection piece 100a of the movable plate 100. Connected on the movable plate 100 is a plunger 101a of the electromagnet for EJECT motion 101 which can be slided in same direction as the traveling direction of the head-mounting plate 19 (the direction of arrows A and B).

The electromagnet for EJECT motion 101 is disposed on the upper surface of the protruded wall 2 of the main plate 3. Accordingly, when the electromagnet for EJECT motion 101 is turned on, the movable plate 100 is traveled in the direction of arrow B together with the plunger 101a of the electromagnet 101 to allow the second trigger arm 96 to be rotated counterclockwise. Then, the first trigger arm 94 is rotated counterclockwise so that the latch portion 94a can be separated from the latch ends 93a and 93b of the partial toothed gear 33 to release the rotation restriction to the partial toothed gear 33. The movable plate 100 is biased toward the direction of arrow A by means of the returning spring 102.

As shown in FIGS. 4 and 6, a spring 104 is positioned between a spring rack 94c of the first trigger arm 94 and a spring rack 103a of a detector lever 103. The detector lever 103 is disposed on the main plate 3 to slide in same direction as the traveling direction of the head-mounting plate 19 (the direction of arrows A and B). The detector lever 103 has first and second projection pieces 103b and 103c which are disposed at one end and the middle thereof, respectively. The spring 104 urges the detector lever 103 toward the direction of arrow A. The first projection piece 103b of the detector lever 103 is engaged with a latch end 50b of the second armature 50. Thus, when the electromagnet for PLAY motion 46 is turned off, the detector lever 103 is slided in the direction of arrow A by means of the elastic force of the spring 104 to allow the second projection piece 103c to be made contact with a protuberance 105a of a rocking arm 105. On the other hand, when the electromagnet for PLAY motion 46 is turned on, the second armature 50 is rotated clockwise to allow the detector lever 103 to be slided in the direction of arrow B against the elastic force of the spring 104 so that the protuberance 105a of the rocking arm 105 will not be pressed by the second projection piece 103c. The rocking arm 105 at the middle thereof is supported rotatably on a mouting shaft 106. Pins 108a and 108b which are projected from respective friction plates 107a and 107b of the friction cluch mechanism are made contact with contact surface 105b and 105c on opposite ends of the rocking arm 105, respectively. The friction plates 107a and 107b are respectively desposed between two reel supports 6a and 6b and respective coresponding reel gears 17a, 17b, 18a and 18b. A cam contact protuberance 105d is projected from the rocking arm 105. The cam contact protuberance 105d is contact with first and second cams 119 and 110 which are mounted on the first cam gear 35. Accordingly, when the reel support 6a or 6b is rotated, the pin 108a or 108b of the friction plate 107a or 107b is made contact with the contact surface 105b or 105c of the rocking arm 105 by the turning force of the reel support 6a, or 6b so that the rocking arm 105 can be rotated counterclockwise to allow the cam contact protuberance 105d to be made contact with a first cam 109. Also, when the reel support 6a or 6b is overloaded beyond a given value on reaching the end of tape and then the reel support 6a or 6b is stopped, the turning force of the friction plate 107a, or 107b is lost so that the rocking arm 105 will not be rotated counterclockwise. Therefore, the rocking arm 105 is rotated clockwise by means of the first cam 109, and then rotated again clockwise by means of the second arm 110. Thus, as the rocking arm 105 rotates clockwise, the protuberance 105a presses the inclined surface 94d on one end of the first trigger arm 94 so that the first trigger arm 94 can be rotated counterclockwise to separated the latch portion 94a from the latch end 93a or 93b of the partial toothed gear 33.

Mounted on the upper surface of the main plate 3 is a rotatable plate 111, as shown in FIG. 11 to 17. The rotatable plate 111 is disposed so that mounting shafts 113a and 113b on the opposite protuberances of the front wall 3a of the main plate 3 can be inserted rotatably in mounting holes 112a and 112b on the opposite sides of the front end thereof, respectively. Therefore, the rotatable plate 111 can be rotated upwardly and downwardly about the mounting shafts 113a and 113b. Disposed under the rotatable plate 111 is a cassette holder 114 for holding the tape cassette 115.

The cassette holder 114 has an opening for inserting and removing tape cassette 114a at opposite sides of the rear end thereof. Matching protuberances 116a and 116b which are protruded from the upper surface of the cassette holder 114 at either side thereof are matched movably with matching openings 117a and 117b on the rear end of the rotatable plate 111. Also, protuberances 118a and 118b which are projected from one side of the cassette holder 114 are associated movably with inclined openings 120a and 120b of a slide piece 119. The slide piece 119 is mounted on the inner surface of one side wall 3b of the main plate 3 to slide in same direction as the traveling direction of the traveling plate 30 (the direction of arrow C and D) and biased toward the direction of arrow D by means of a return spring 121. Protruded from the slide piece 119 are first to fourth matching protuberances 122a to 122d. These first to fourth matching protuberances 112a to 112d are matched movably with first to fourth maching openings 123a to 123d which are punched in one side wall 3b of the main plate 3, respectively. An ejector lever 124 is mounted on the other surface of one side wall 3b of the main plate 3 to engage movably with the slide piece 119 and biased toward the direction of arrow D by means of a return spring 125. The ejector lever 124 has first and second matching openings 126a and 126b, and a maching protuberance 127. The second and third matching protuberances 122a and 122c of the slide piece 119 is matched operatively with first and second matching openings 126a and 126b respectively, whereas the matching protuberance 127 is matched with a fifth matching opening 123e of the side wall 3b of the main plate 3. With this arrangement of parts, the slide piece 119 can be connected with the ejector lever 124 without using of any fixed member.

Inserted rotatably in a mounting opening 128 on the upper edge of the ejector lever 124 is a rod 129 to which a spring support 130 at the middle thereof is connected. The spring support 130 at one end thereof is supported on the upper surface of the rotatable plate 111 by means of a mounting shaft 130a and at the other end thereof connected to the slider 132 through a reverse-turn spring 131. The slider 132 travels along a slide opening 111a in same direction as the traveling direction of the transport plate 30 (the direction of arrows C and D). The slider 132 is engaged with a reel hole 115a of the tape cassette 115 which is loaded in the cassette holder 114. Accordingly, when the slider 132 is slided in the direction of arrow C by loading of the tape cassette 115 to reach a certain position, the spring support 130 is rotated reversely by the elastic force of the reverse-turn spring 131. A lock plate 133 is mounted on the under side of the rotatable plate 111 to turn on same axis as that of the spring support 130. The lock plate 133 is biased clockwise by means of the return spring 134. Disposed on the lock plate 133 is a latch claw 136 on which a hook 135 of the slide piece 119 can be latched to allow the traveling of the slide piece 119 on the direction of arrow D to be stopped. Matching pieces 139a and 139b which are disposed on one end of the ejector plate 138 are matched rotatably with the matching openings 137a and 137b of the ejector lever 138 by inserting thereabove. The ejector plate 138 at the middle thereof is connected slidably to the movable plate 100. Therefore, the ejector plate 138 is slided in the direction of arrows C and D on the movable plate 100, but rotated about the matching pieces 139a and 139b in case that the movable plate 100 travels in the direction of arrows A and B. A hook 140 on the other end of the ejector plate 138 is matched removably on a matching end 141 of the rocking lever 58.

Accordingly, when the electromagnet for EJECT motion 101 is turned on to allow the movable plate 100 to be traveled in the direction of arrow B, the ejector plate 138 is rotated clockwise so that the hook 140 can be latched on the latch end 141 of the rocking lever 58. The ejector mechanism comprises the slide piece 119, the ejector lever 124, the rod 129, the reverse-turn spring 131, the slider 132, the lock plate 133 and the ejector plate 138.

Mounted rotatably on the upper surface of the main plate 3 by means of the mounting shaft 143 is a rotatable member 142. The rotatable member 142 has a roller contact portion 142a and a roller press portion 142b. The roller contact portion 142a contacts with a first roller 144 and is supported rotatably on the inner surface of the slide piece 119. When the slide piece 119 is traveled in the direction of arrow C to enable the first roller 144 to be made contact with the roller contact portion 142a of the rotatable member 142, the rotatable member 142 is rotated clockwise so that the roller press portion 142b can be made contact with the second portion 145 of the head-mounting plate 19 to allow the head-mounting plate 19 to be forcedly traveled in the direction of arrow B.

Figure 12:
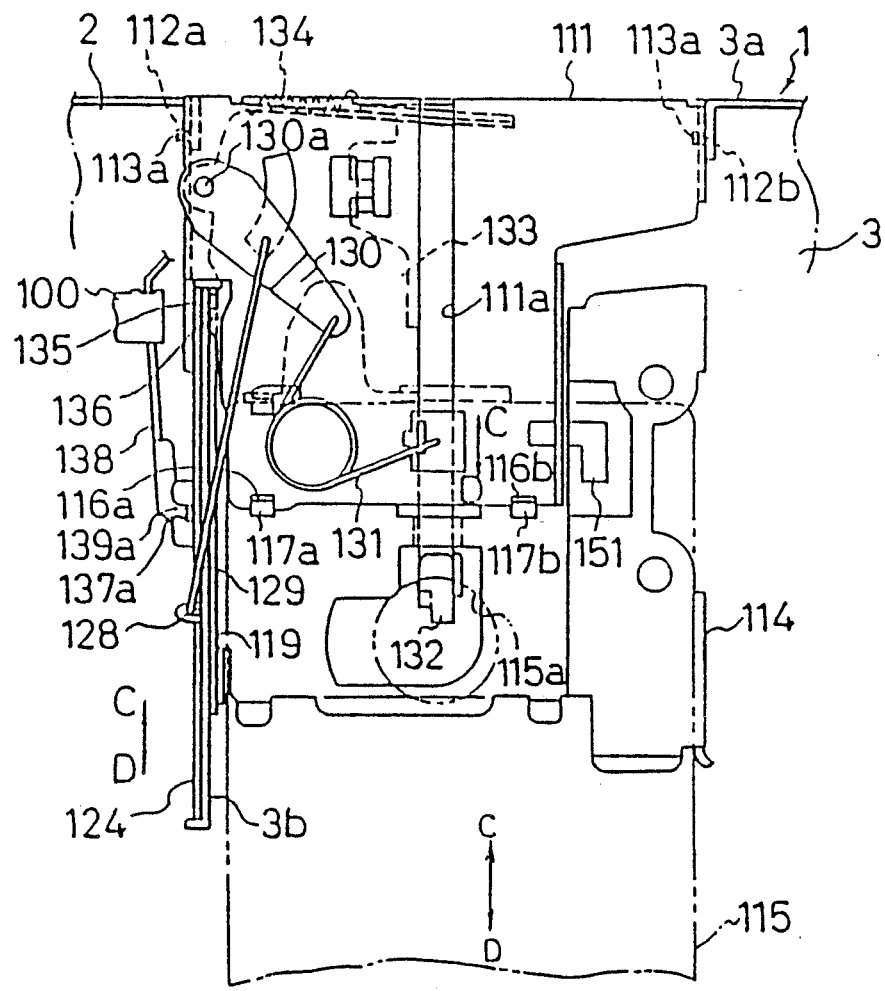
FIGS. 12 and 13 are top plan views of the components, as depicted in FIG. 11, illustrating the loading and ejecting motion of the tape cassette.
Figure 13:
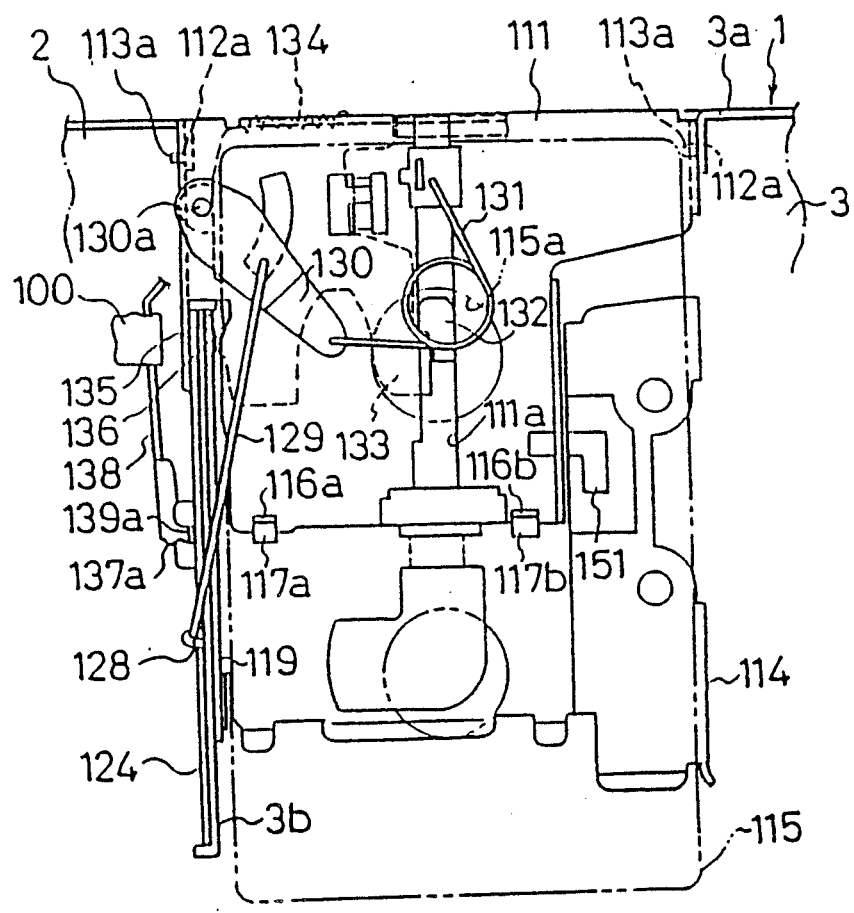
Figure 16:
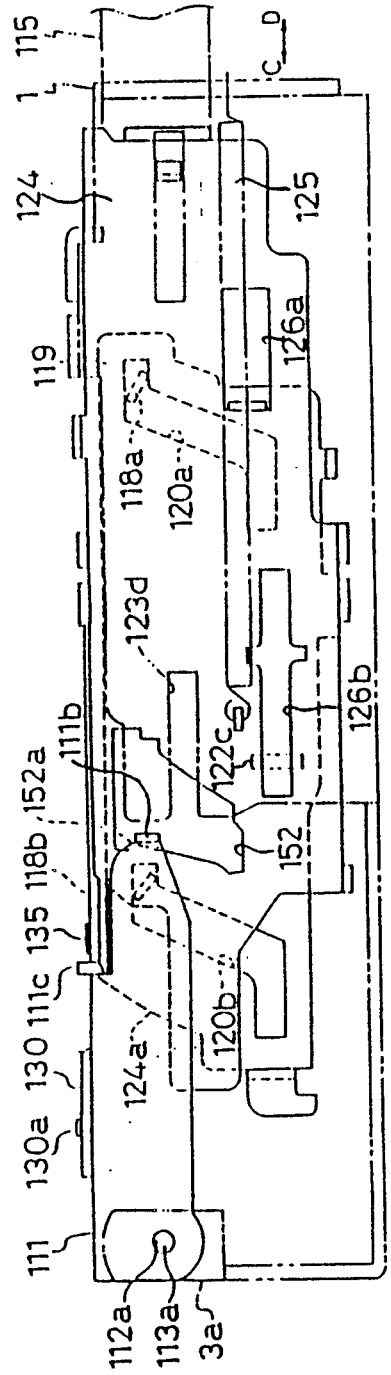
Figure 17:
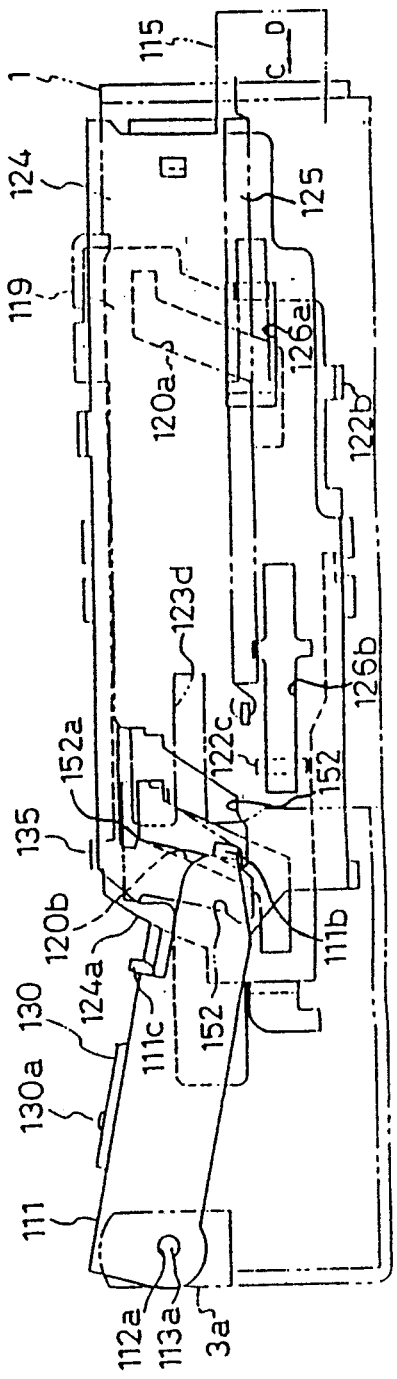

Accordingly, if the electromagnet for EJECT motion 101 has gone wrong, the ejector lever 124 can travels in the direction of arrow C by manual operation so as to move the slide piece 119 in the direction of arrow C, thereby moving the head-mounting plate 19 in the direction of arrow B. Disposed on same axis as that of the first roller 144 is a second roller 146. The second roller 146 contacts with the inner surface of one side wall 3a of the main plate 3. Projected from the surface of the main plate 3, as shown in FIG. 5, are inclined press pieces 147a and 147b. Therefore, when the head-mounting plate 19 travels in the direction of arrow A, the force caused by contacting of a portion of the head-mounting plate 19 with the press pieces 147a and 147b prevents the head-mounting plate 19 from being laterally pushed on, and lifting up from, the main plate 3. As shown in FIG. 4, the partial toothed gear 33 includes a pair of latch protuberances 148a and 148b which are positioned in the outer circumference than that of the contact ends 93a and 93b and spaced at intervals of an angle of 180°. Accordingly, if the first trigger arm 94 is incompletely clockwise-rotated not to allow the portion 94a to be made contact with the contact end 93a, or 93b, the portion 94a will be made contact with the latch protuberances 148a and 148b to securely check the rotation of the partial toothed gear 33. The movable plate 30 is connected to a change-over operation body 150a of the slide type head channel change-over switch 150 through the spring 149 so that together with the traveling of the movable plate 39, the change-over operation body 150a can be actuated to change channel of the magnetic head 23. As shown in FIGS. 12 and 13, a leaf spring 151 on the rotatable plate 111 functions as a press spring to push the tape cassette 115 toward the main plate 3.

The loading operation of the tape recorder according to the present invention will now be described. Reffering now to FIGS. 1, 12, 14 and 16, there are illustrated the tape recorder in the stationary atate. In this stationary state, the tape recorder is maintained so that the slider 132 will be positioned in the position of the direction of arrow D by the elastic force of the reverse-turn spring 131 and also that the spring support 130 will be positioned in the clockwise-rotated position together with the lock plate 133 by the elastic force of the reverse-turn spring 131, as can be understood from FIG. 12. Further, as shown in FIG. 12 and 14, the hook 135 of the slide piece 119 is latched on the latch claw 136 of the lock plate 133 so that the slide piece 119 will be maintained in the position shown in FIG. 14 which is not traveled in the direction of arrow D against the elastic force of the return spring 121. Also, as shown in FIG. 12, the upper edge of the slide piece 119 contacts with the latch claw 136 of the lock plate 133 so that the rotatable plate 111 will be maintained in the position shown in FIG. 16 which is not rotated clockwise together with the lock plate 133. Therefore, the cassette holder 114 is maintained in the raised position which the protuberances 118a and 118b of the cassette holder 114 are located on the upper end of the inclined openings 120a and 120b on the slide piece 119, as shown in FIG.

14. Also, the engaging piece 111b which is projected from one side wall of the rotatable plate 111 is made contact with and engaged with a side edge portion 152a of a sixth opening 152 of the ejector lever 124 so that the ejector lever 124 can be maintained in the position shown in FIG. 16 which is not moved in the direction of arrow D against the elastic force of the return spring 125.

In such a condition, as the tape cassette 115 is inserted in the direction of arrow C through the opening 114a, the slider 132 is matched with the reel opening 115a of the tape cassette 115 (FIG. 14). As the tape cassette 115 is again pushed into the direction of arrow C, the slider 132 is moved in the direction of arow C against the elastic force of the reverse-turn spring 131. When the tape cassette 115 reaches a certain position of the direction of arrow C, the reverse-turn spring 131 is reversed so that the tape cassette 115 can be introduced into the traveling limit position of the direction of arrow C together with the slider 132 as shown in FIG. 13. Further, as the slider 132 travels in the direction of arrow C, a portion of the slider 132 is made to contact with the lock plate 133 so that the lock plate 133 can be rotated counterclockwise against the elastic force of the return spring 134 from the position shown in FIG. 12. Thus, the latch claw 136 is released from the hook 135 of the slide piece 119 by the counterclockwise rotation of the lock plate 133 to allow the slide piece 119 to travel in the direction of arrow D by means of the elastic force of the return spring 121 and to be positioned in the position as shown in FIG. 15. Also, the latch claw 136 is separated from the upper end edge of the slide piece 119 by the counterclockwise rotation of the lock plate 133 to allow the rotatable plate 111 together with the lock plate 133 to be rotated clockwise by the elastic force of the spring (not shown) from the position shown in FIG. 14 and to be positioned in the position shown in FIG. 15. As the rotatable plate 111 rotates clockwise, the protuberances 118a and 118b of the cassette holder 114 is moved toward the lower end of the inclined openings 120a and 120b so that the cassette holder 114 will be horizontally lowered and positioned in the state shown in FIG. 15 which the tape cassette 115 is loaded in the operationalized position. Once the tape cassette 115 is loaded in the operationalized position, the motor switch (not shown) is turned on to rotate the motor for transporting tape 5. As the motor 5 rotates, each of capstan shafts 7a and 7b rotates in the direction of arrow shown in FIG. 2 through the belt-driven rotation transmission mechanism.

The PLAY operation of the tape recorder according to the present invention will now be described.

When the operator turns on the operation switch (not shown) to put the tape recorder into the PLAY mode after loading of the tape cassette 115, the electromagnet for PLAY motion 46 only is turned on. So, the attraction portion 46a of the electromagnet 46 attracts the portion 49a of the first armature 49 to allow the rotatable lever 53 to be rotated counterclockwise about the base end 53a thereof. Together with such a rotation of the rotatable lever 53, the latch piece 56a of the pull arm 56 is inserted into the latched on the latch groove 54. In the meantime, the seconed armature 50 is kept from clockwise-rotating and not attached to the electromagnet for PLAY motion 46, since the latch piece 67 is made to contact with one side end of the slide lever 55.

On the other hand, since the second cam gear 61 is engaged with the small diameter gear 36 in the stationary state of the tape recorder (FIG. 1), the turning force of the motor for transporting tape 5 is transmitted to the second cam gear 61 through the first gear 9, the seond gear 10, the third gear 11, the fourth gear 12, and the small diameter gear 36 of the gear-driven rotation transmission mechanism 8. Therefore, the second cam gear 61 is rotated in the direction of arrow shown in FIG. 2. Together with such a rotation of the second cam gear 61, the rocking lever 58 which has made contact with the cam 62 through the cam roller 60 is turned clockwise on the mounting shaft 59 from the position shown in FIG. 2. Then, the pull arm 56 which is disposed on same shaft as that of the pinch roller arm 37b is rotated counterclockwise from the position shown in FIG. 2. Since the latch piece 56a of the pull arm 56 is inserted in and latched on the latched on the latch groove 54, the counterclockwise rotation of the pull arm 56 allows the slide lever 55 to travel in direction of arrow·C together with the rotatable lever 53 and to be positioned in the position shown in the solid line in FIG. 3 from the position shown in FIG. 2. As the slide lever 55 travels in the direction of arrow C, the latch piece 67 is lodged or latched on the latch groove 70 so that the second armature can be rotated clockwise by means of the elastic force of the spring 69 to allow the portion 50a to be attracted and attached to the attraction portion 46b of the electromagnet for PLAY motion 46.

Therefore, the slide lever 55 is maintained in the traveled position of the direction of arrow C. In accordance with this positioning of the slide lever 55, the head-extrusion spring 63 is rotated counterclockwise so that the first portion 64 of the head-mounting plat 19 can be pressed by a portion of the press member 65. The head-mounting plate 19 travels in the direction of arrow A against the elastic force of the head-return spring 25 by pressing of the first portion 64. At this time, since the change lever for high-speed rotation 88 is positioned and maintained in the neutral position (i.e., the position which the change gear for high-speed rotation 90 is not engaged with any reel gears 18a and 18b, as shown in FIG. 7), the head-mounting plate 19 travels by stroke S in the direction of arrow A until the stopper protuberance 91 on the change lever for high-speed rotation 88 is made contact with the first recess 92a of the engaging opening 92. Thus, the head-mounting plate 19 is located in the position for PLAY motion which the magnetic head 23 is made contact with the tape 115b of the tape cassette 115. During traveling of the head-mounting plate 19 on the position for PLAY motion, if the transport plate 30 is maintained in the traveled position of the direction of arrow C (FIG. 1), the support member 27 will be traveled in the direction of the arrow C together with the change gear for low-speed rotation 28, having been guided by the guide edges 31a and 31b of the guide opening 31 on the transport plate 30. Then, the change gear for low-speed rotation 28 engages with the sixth gear 14 of the gear-driven rotation transmission mechanism 8 and the reel gear for low-speed rotation 17b on the side of the reel support 6b. Therefore, the turning force of the motor 5 is transmitted to the reel support 6b through the first gear 9, the second gear 10, the third gear 11, the fourth gear 12, the fifth gear 13, the sixth gear 14, the change gear for low-speed rotation 28, and the reel gear for low-speed rotation 17b so that the reel support 6b will be rotated counterclockwise at low speed (or normal speed). Moreover, if the rod-shaped spring 41 is maintained in traveled position of the direction of arrow C (FIG. 4), together with the transport plate 30, which the contact bend 41a of the rod-shpped spring 41 is made contact with the guide piece 45a and which the contact bend 41b is separated from the guide piece 45b, the pinch roller arm 37b will be rotated clockwise by the elastic force of the rod-shaped spring 41 and made to contact with the capstan shaft 7b through the medium of the pinch roller 38b and the tape 115b, whereas the pinch roller 38a of the pinch roller arm 37a will not be made to contact with the capstan shaft 7a. Therefore, the PLAY operation which the tape 115b is wound from the reel support 6a toward the reel support 6b can be performed.

Also, during traveling of the head-mounting plate 19 on the position for PLAY motion, if the transport plate 30 is maintained in the traveled position of the direction of arrow D, the support member 27 will travel in the direction of arrow D together with the change gear for low-speed rotation 28, having been guided by the guide edge 31d and 31c of the guide opening 31 on the transport plate 30. Then, the change gear for low-speed rotation 28 engages with the eighth gear 16 of the gear-driven rotation transmission mechanism 8 and the reel gear for low-speed rotation 17a on the side of the reel support 6a. Therefore, the turning force of the motor 5 is transmitted to the reel support 6a through the first gear 9, the second gear 10, the third gear 11, the fourth gear 12, the fifth gear 13, the seventh gear 14, the eighth gear 16, the change gear for low-speed rotation 28 and the reel gear for low-speed rotation 17a so that the reel support 6a will be rotated clockwise at a low speed. Moreover, if the rod-shaped spring 41 is maintained in the traveled position of the direction of arrow D, together with the transport plate 30, which the contact bend 41b of the rod-shaped spring 41 is made contact with the guide piece 45b and which the contact bend 41a is separated from the guide 45a, the pinch roller arm 37a will be rotated counterclockwise by the elastic force of the rod-shaped spring 41 and made contact with the capstan shaft 7a through the medium of the pinch roller 38a and the tape 115b, whereas the pinch roller 38b of the pinch roller arm 37b will not be made contact with the capstan shaft 7b. Therefore, the PLAY operation which the tape 115b is wound from the reel support 6b toward the reel support 6a can be performed.

The AUTO-REVERSE operation of the tape recorder according to the present invention will now be explained.

For example, in the PLAY operation which the tape 115b is wound from the reel support 6a toward the reel support 6b, as shown in FIGS. 3 and 4, the pin 108b is maintained to press the contact surface 105c of the rocking arm 105 and to rotate it counterclockwise, owing to the counterclockwise rotation of the friction plate 107b. Thus, the cam contact protuberance 105d of the rocking arm 105 always contacts with the first cam 109 of the first cam gear 35 so far as the friction plate 107b rotates. Also, the first cam gear 35 is engaged with the small diameter gear 36 of the gear-driven rotation transmission mechanism 8 and rotated clockwise.

However, when the tape 115b is completely wound from the reel support 6a toward the reel support 6b and has reached the end thereof, the friction plate 107b is stopped together with the reel support 6b. As a result, the turning force of the rocking arm 105 dies out. And then, the rocking arm 105 is rotated clockwise by the first cam 109 of the first cam gear 35 travels in a state in which the cam contact protuberance 105d contacts the most remote portion from the center of the first cam 109. Then, the second cam 110 of the first cam gear 35 is positioned and rotated between the first cam 109 and the cam contact protuberance 105d so that the rocking arm 105 will be again rotated clockwise. In accordance with this clockwise-rotating of the rocking arm 105, the protuberance 105a presses the second inclined suface 94d of the first trigger arm 94. The first trigger arm 94 is rotated counterclockwise to allow the latch portion 94a to be released from the latch end 93a of the cam 93 on the partial toothed gear 33, and thereby to remove the rotation restriction to the partial toothed gear 33. It should be noted that the transport plate 30 is connected to the change-over operation body 150a of the head channel change-over switch 150 through the spring 149. Accordingly, if the transport plate 30 is in a state which is traveled in the direction of arrow C, the spring 149 will be pressed in the direction of arrow C with the change-over operation body 150a maintained in the traveling limit position thereof. Thus, the change-over operating body 150a is turned back in the direction of arrow D by the elastic force of the spring 149 so that the clockwise turning force can be acted on the partial toothed gear 33 which the engaging pin 34 is engaged with the engaging opening 32 of the transport plate 30. However, since the portion 94a of the first trigger arm 94 contacts with the latch end 93a, the clockwise rotation of the partial toothed gear 33 is obstructed.

When the latch portion 94a is released from the latch end 93a, as above-mentioned, the partial toothed gear 33 which the clockwise rotation was to be obstructed is rotated clockwise until engaging with the first cam gear 35. After engaged with the first cam gear 35, the partial toothed gear 33 is rotated clockwise by an angle of 180° by means of the turning force of the first cam gear 35. The transport plate 30 which the engaging opening 32 is engaged with the engaging pin 34 travels in the direction of arrow D from the position shown in FIG. 4. In accordance with this traveling of the transport plate 30, the head channel change-over switch 150 is changed, and at the same time, the change gear for low-speed rotation 28 travels in the direction of arrow D together with the support member 27, having been guided by the guide edge 31a of the guide opening 31. Then, the change gear 28 engages with the eighth gear 16 of the gear-driven rotation transmission mechanism 8 and the reel gear 17a on the side reel support 6a to allow the reel support 6a to be rotated counterclockwise at a low speed. Moreover, since the rod-shaped spring 41 travels in the direction of arrow D together with the transport plate 30, the pinch roller arm 37a is rotated counterclockwise by the elastic force of the rod-shaped spring so that the pinch roller 38a is made contact with the capstan shaft 7a through the medium of the tape 115b, and the pinch roller arm 37b is also rotated counterclockwise so that the pinch roller 38b can be separated from the capstan shaft 7b. Therefore, the traveling direction of tape is reversed and the PLAY operation which tape 115b is wound from the reel support 6b toward the reel support 6a is performed. The pin 108a of the friction plate 107a rotating in accordance with such a PLAY operation presses the contact surface 105b of the rocking arm 105 so that the counterclockwise turning force can act on the rocking arm 105. Then, the cam contact protuberance 105d is made to contact with the first cam 109 of the first cam gear 35, and at the same time, the first trigger arm 94 is rotated clockwise by the force of the return spring 104 to enable the portion 94 to contact with the latch end 93b of the cam 93, and thereby to restrict again the rotation of the partial toothed gear 33.

Thus, the AUTO-REVERSE operation is repeated whenever the tape 115b has reached the end thereof.

The MANUAL-REVERSE operation of the tape recorder will now be described.

When the operator turns on the manual switch (e.g., in the PLAY opeation when tape 115b is wound from reel support 6a towards reel support 6b, as shown in FIG. 4); for changing traveling direction (not shown), the electromagnet for EJECT motion is turned on. So, the movable plate 100 with the plunger 101a travels in the direction of arrow B against the return spring 102, and therefore the second trigger arm 9b is rotated counterclockwise. Since the pin 97 presses the first inclined surface 94b of the first trigger arm 94, the first trigger arm 94 is rotated counterclockwise to enable the latch portion 94a to be released from one latch end 93a of the partial toothed gear 33. Hence, the partial toothed gear 33 is rotated clockwise and engaged with the first cam gear 35, and then rotated clockwise by an angle of 180° by means of the turning force of the first cam gear 35. Together with this rotation of the partial toothed gear 33, the transport plate 30 travels in the direction of arrow D. Also, as described for the above-mentioned AUTO-REVERSE operation, the reel support 6a is rotated clockwise by the turning force of the motor for transporting tape 5, and at the same time, the pinch roller 38a is made contact with the capstan shaft 7a, and the pinch roller 38b is separated from the capstan shaft 7b. Thus, by the manual operation, the traveling direction of tape is reversed and the PLAY operation which the tape 115b is wound from the reel support 6b toward the reel support 6a can be performed.

The FAST FORWARD operation of the tape recorder will now be explained.

When, for example, in the PLAY operation which the tape 115b is wound from the reel support 6a toward the reel support 6b, as shown in FIG. 4, the operator turns on the FAST FORWARD switch (not shown) to put the tape recorder into the FAST FORWARD mode, the electromagnet for PLAY motion which was to be turned on up to that time is turned off, and then turned on again at the same time as the electromagnet for FAST FORWARD motion 48. Namely, as the electromagnet for PLAY motion 46 is turned off, the slide lever 55 travels in the direction of the arrow D from the position shown in the solid line in FIG. 3 by means of the elastic force of the head-extrusion spring 63 and turned back in the position shown in the chain line in FIG. 3. Then, the pull arm 56 and the rocking lever 58 are rotated clockwise and counterclockwise, respectively. As a result, the cam roller 60 of the rocking lever 58 is contact-traveled from the remotest portion to the nearest portion of the center of the cam 62 so that the second cam gear 61 will be rotated counterclockwise and engaged with the small diameter gear 36 of the gear-driven rotation transmission mechanism 8. Thereafter, the second cam gear 61 is turned counterclockwise over about once by means of the turning force of the small diameter gear 36. Also, as the electromagnet for PLAY motion 46 is again turned on, the slide lever 55 travels in the direction of arrow C, in the same way as in above-mentioned PLAY operation.

On the other hand, as the electromagnet for FAST FORWARD motion 48 is turned on, the portion 72a of the fourth armature 72 is attracted by and attached to the attraction portion 48a of the electromagnet for FAST FORWARD motion 48 so that fourth armature 72 can be rotated clockwise. Since the clockwise rotation of the fouth armature 72 allows the protuberance 75b of the member for changing the traveling direction of tape 75 to be pressed by the press end 72b, the member 75 is rotated counterclockwise from the position shown in FIG. 7. Together with this rotation of the member 75, the rotatable member 79 is rotated in the direction of arrow A from the position shown in FIG. 7. In such a state, the slide lever 55 is moved in the direction of arrow C so that the portion 81b of the rotatable member 79 can be pressed by the press portion 83b of the slide lever 55. Hence, the rotatable member 79 is turned clockwise on the support shaft 80. By rotating of the rotatable member 79, the slide plate 85 is moved in the direction of arrow D and the change lever for high-speed rotation 88 which is connected to the slide plate 85 through the spring 87 is rotated clockwise from the neutral position shown in FIG. 7.

Figure 9:
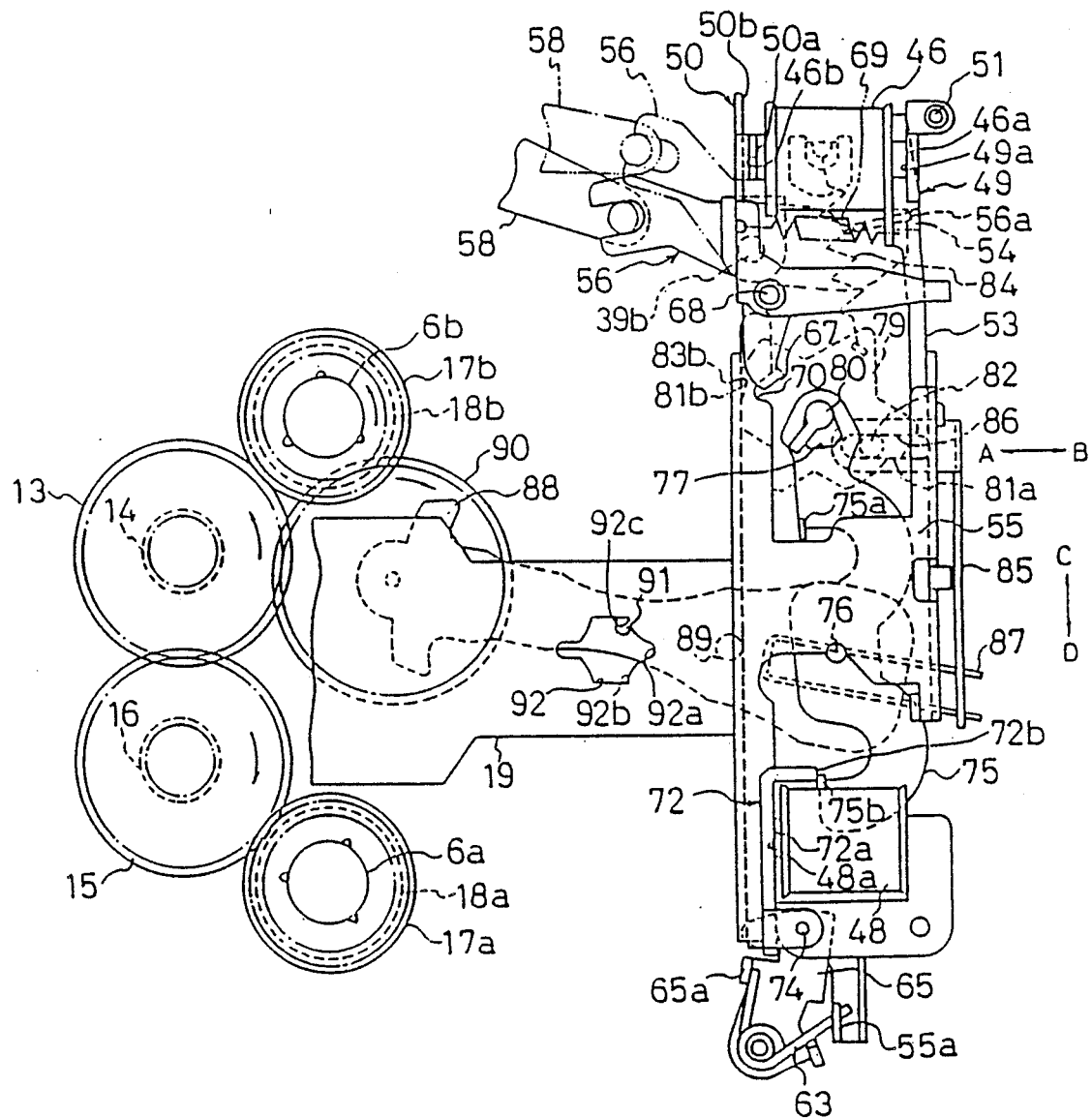
FIGS. 9 and 10 illustrate the operation of the high-speed rotation transmission mechanism.

On the other hand, the head-mounting plate 19, as the slide lever 55 travels in the direction of arrows C, will travel in the direction of arrow A, in the same way as above-mentioned PLAY operation. In this case, since the change lever for high-speed rotation 88 rotates clockwise as above, the stopper protuberances 91 of the lever 88 is engaged with third engaging portion 92c of the engaging 92. As a result, the traveling stroke of the direction of arrow A for the head-mounting plate 19 is defined as S1. This traveling stroke S1 is smaller than the stroke S in the PLAY operation. Therefore, the change gear for low-speed rotation 28 is not engaged with any gears, and at the same time, the magnetic head 23 is maintained not to make contact with the tape 115b so that the pinch roller 38b can be separated from the capstan shaft 7b. Also, the change gear for high-speed rotation 90 engages with the fifth gear 13 of the gear-driven rotation transmission mechanism 8 and the reel gear for high-speed rotation 18b on the side of the reel support 6b to turn counterclockwise the reel support 61 at a high-speed (see FIG. 9). Thus, the tape 115b will be forwarded fast from the reel support 6a toward the reel support 6b.

The REWIND operation of the tape recorder will now be described.

When, for example, in the PLAY operation which the tape 115b is wound from the reel support 6a toward the reel support 6b, as shown in FIG. 4, the operator turns on the REWIND switch (not shown) to put the tape recorder into the REWIND mode, the electromagnet for PLAY motion 46 which was to be turned on up to that time is turned off, and then turned on again at the same time as the electromagnet for REWIND motion 47. Namely, as the electromagnet for PLAY motion 46 is turned off, the slide lever 55 is turned back from the position shown in the solid line in FIG. 3 to the position shown in the chain line in FIG. 3, and thereby the pull arm 56 and the rocking lever 58 are respectively rotated clockwise and counterclockwise, as mentioned in the FAST FORWARD operation. As a result, the cam roller 58 is contact-traveled from the remotest position to the nearest portion of the cam 62 so that the second cam gear 61 will be rotated counterclockwise and engaged with the small diameter gear 36 of the gear-driven rotation transmission mechanism 8. Thereafter, the second cam gear 61 is turned counterclockwise over about once by means of the turning force of the small diameter gear 36. Also, as the electromagnet for PLAY motion 46 is again turned on, the slide lever 55 is traveled in the direction of arrow C, in the same way as in above-mentioned PLAY operation.

On the other hand, as the electromagnet for REWIND motion 47 is turned on, the portion 71a of the third armature 71 is attracted by and attached to the attraction portion 47a of the electromagnet 47 so that the third armature 71 can be rotated counterclockwise. Since the counterclockwise rotation of the third armature 71 allows the protuberance 75a of the member for changing the traveling direction of tape 75 to be pressed by the press end 71b, the member 75 is rotated clockwise from the position shown in FIG. 7. Together with this rotation of the member 75, the rotatable member 79 is rotated in the direction of arrow B from the position shown in FIG. 7. In such a state, the slide lever 55 is moved in the direction of arrow C so that the portion 81a of the rotatable member 79 can be pressed by the press portion 83a of the slide lever 55. Hence, the rotatable member 79 is turned counterclockwise on the support shaft 80. By rotating of the rotatable member 79, the slide plate 85 is moved in the direction of arrow C and the change lever for high-speed rotation 88 is rotated counterclockwise from the neutral position shown in FIG. 7.

Figure 10:
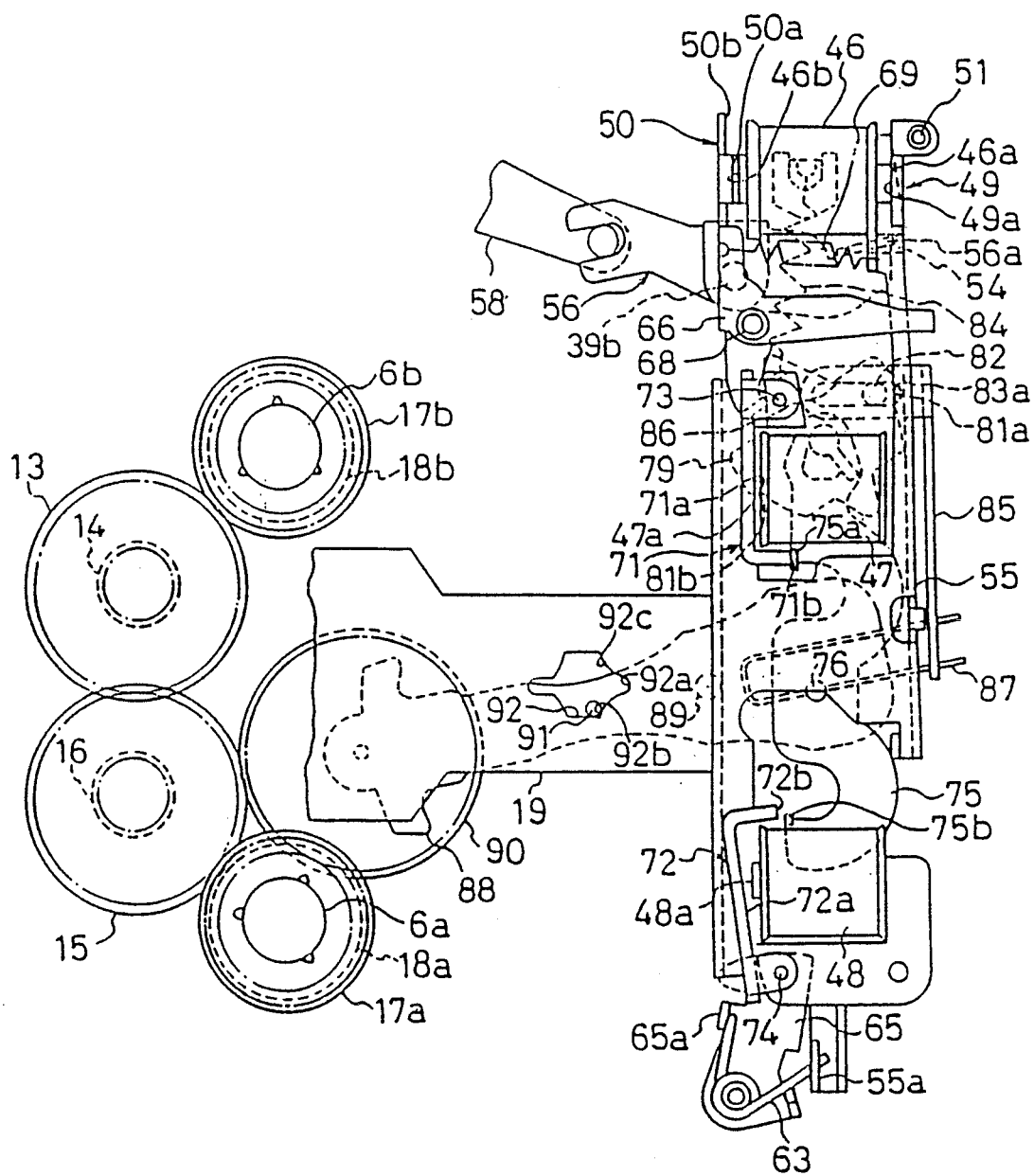
Figure 11:
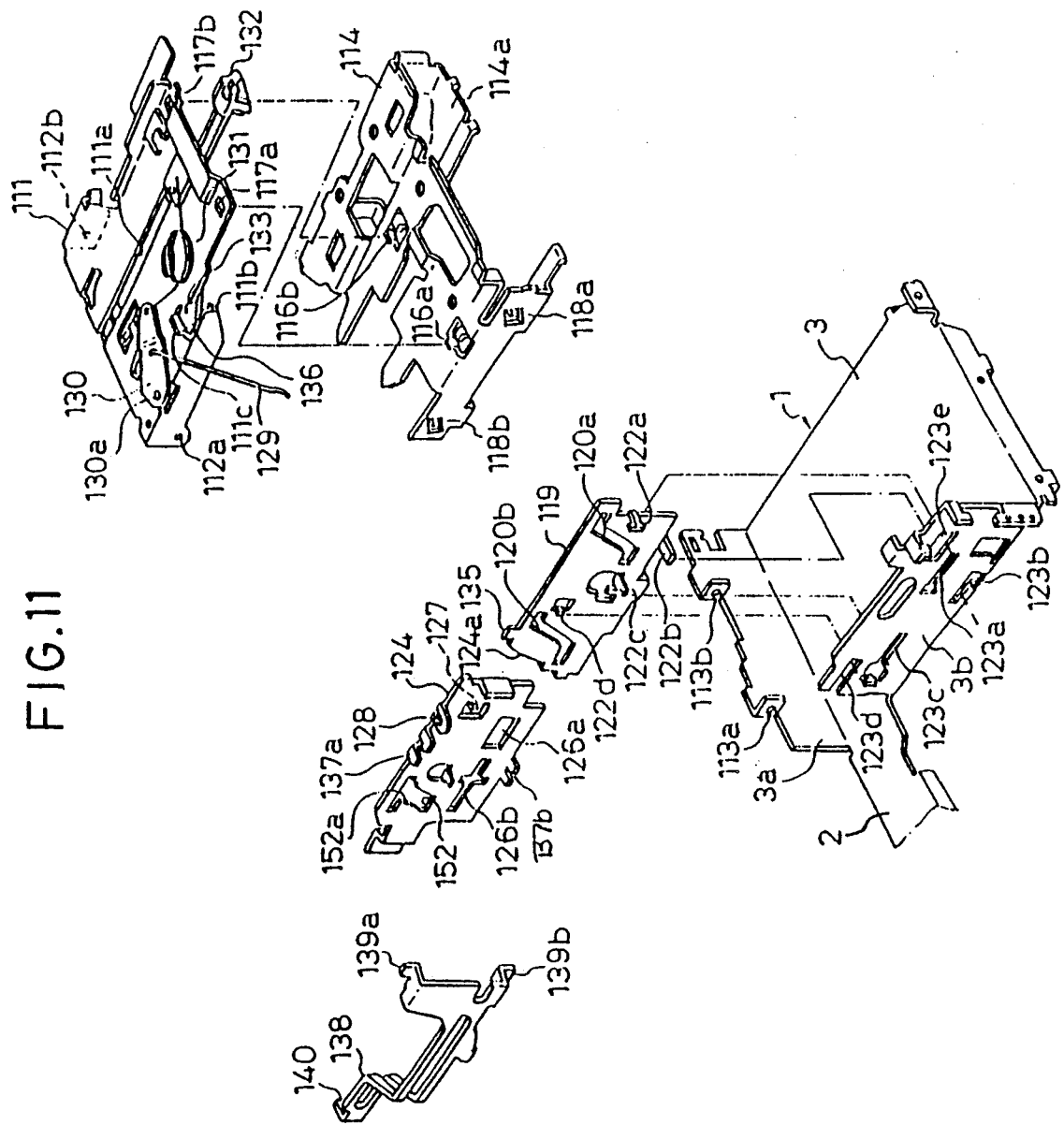
FIG. 11 is an exploded perspective view of the components for loading and ejecting the tape cassette.

On the other hand, the head-mounting plate 19, as the slide lever 55 travels in the direction of arrow C, will travels in the direction of arrow A in the same way as above-mentioned PLAY operation. In this case, since the change lever for high-speed rotation 88 rotates counterclockwise as above, the stopper protuberance 91 of the lever 88 is engaged with the second engaging portion 92b of the engaging opening 92. As a result, the traveling stroke of the direction of arrow A for the head-mounting plate 19 is defined as S1. This traveling stroke S1 is smaller than the stroke S in the PLAY operation. Therefore, the change gear for low-speed rotation 28 is not engaged with any gears, and at the same time, the magnetic head 23 is maintained not to make contact with the tape 115b so that the pinch roller 38b can be separated from the capstan shaft 7b. Also, the change gear for high-speed 90 engages with the seventh gear 15 of the gear-driven rotation transmission mechanism 8 and the reel gear 17a for high-speed rotation 17a on the side of the reel support 6a to turn clockwise the reel support 6a at a high speed (see FIG. 10). Thus, the tape 115b will be forwarded fast from the reel support 6b toward the reel support 6a.

The EJECT operation of the tape recorder according to the present invention will now be described.

Figure 18:
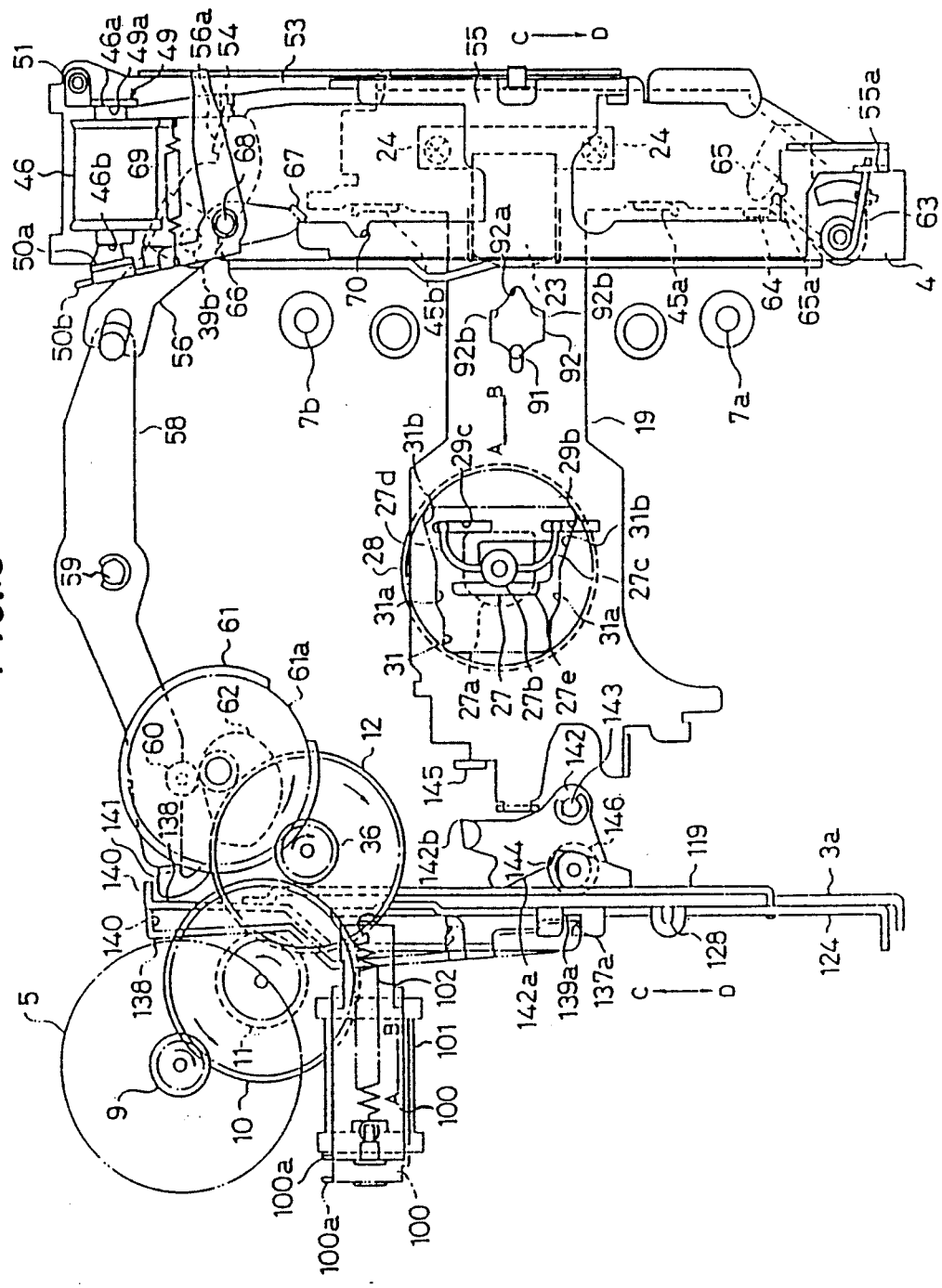

When, for example, in the PLAY operation, the operator turns on the EJECT switch (not shown), the electromagnet for PLAY motion 46 which was to be turned on up to that time is turned off and the electromagnet for EJECT motion 101 only is turned on. Then, the movable plate 100 is moved in the direction of arrow B against the return spring 102 to allow the ejector plate 138 to be rotated clockwise from the position shown in the chain line to the position shown in the solid line in FIG. 18. The hook 140 of the ejector plate 138 engages with the latch end 141 of the rocking lever 58. Hence, the rocking lever 58 is rotated clockwise by the cam 62 which is, in turn, rotated by the small diameter gear 36. Together with this rotation of the rocking lever 58, the ejector plate 138, the ejector lever 124 and the slide piece 119 are moved in the direction of arrow C against the return spring 125 and 121. Then, since the contact edge 124a of the ejector lever 124 makes contact with the contact piece 111c of the rotatable plate 111, as shown in the chain line in FIG. 15, the rotatable plate 111 is rotated counterclockwise to lift up horizontally the cassette holder 114. Thereafter, the latch claw 136 of the lock plate 133 is engaged with the upper edge and the hook 135 of the slide piece 119 so that the cassette holder 114, the ejector lever 124 and the slide piece 119 can be maintained in the position shown in FIG. 14 and FIG. 16.

On the other hand, the spring support 130, as the ejector lever 124 travels in the direction of arrow C, will be rotated counterclockwise from the position shown in FIG. 13 by means of the rod 129. Hence, the reverse-turn spring 131 is reversed and therefore the slide 132 is traveled in the direction of arrow D to allow the tape cassette 115 to be discharged outwardly from the opening 114a, as shown in FIG. 12. Once the tape cassette 115 is discharged, the motor switch (not shown) is turned off to stop the motor for transporting tape 5.

If the electromagnet for EJECT motion 101 has gone wrong, the ejector lever 124 can be traveled in the direction of arrow C against the return spring 125 by means of the manual operation so as to allow the rotatable member 142 to be pressed by the first roller 144 of the slide piece 119. Since the rotatable member 142 rotates clockwise, the press portion 142b presses the second portion 145 of the head-mounting plate 19. Then, the head-mounting plate 19 is traveled in the direction of arrow B against the head-extrusion spring 63. Thus, the tape recorder can be put into the EJECT mode by the manual operation. Also, if the tape recorder is operated to perform the PLAY motion in a state which the electromagnet for PLAY motion 46 is turned off and which the cam contact protuberance 105d of the rocking arm 105 is positioned away from the cam surface of the cam 109, the tape recorder will perform the AUTO-REVERSE motion on staring of the PLAY operation. Therefore, it is essential that the cam contact protuberance 105d is positioned adjacent to the cam surface of the cam 109 before starting of the PLAY operation. To this prupose, when the electromagnet for PLAY motion 46 is turned off, the spring 104 functions to bias the detector lever 103 in the direction of arrow A to enable the protuberance 105a of the rocking arm 105 to be pressed by the second latch projection piece 103c, and thereby to allow the cam contact protuberance 105d to be made contact with the cam surface of the cam 109, as shown in FIG. 6. However, when the electromagnet for PLAY motion 46 is turned on to rotate clockwise the second armature 50, the detector lever 103 is traveled in the direction of arrow B against the return spring 104 to allow the second latch protuberance 103c to be separated and stood aloof from the protuberance 105a of the rocking arm 105, as shown in the chain line FIG. 6.

Moreover, if the latch portion 94a of the first trigger arm 94 is not engaged with the latch end 93a or 93b, the portion 94a is made contact with the latch protuberance 148a or 148b to restrict the rotation of the partial toothed gear 33 at intervals of an angle of 180°. Thus, the continued AUTO-REVERSE operation by the non-stop rotation of the partial toothed gear 33 never occurs.

Further, the rod-shaped spring 41 can be moved smoothly even by the small force, since the roller 43 is disposed on the middle thereof.

Also, the head-mounting plate 19 can be pressed toward the main plate 3, since the force caused by contacting of a portion of the head-mounting plate 19 with the press piece 147a and 147b preventing the head-mounting plate 19 from lifting up from the main plate 3.

The subject invention provides improved tape recorder having a simple construction which is designed to actuate both the ejector mechanism and the head moving mechanism by making use of the turning force of the motor for transporting tape. Also, the present invention provides an improved tape recorder having a simple construction which the motor for transporting tape is able to actuate the head moving mechanism and the high-speed rotation transmission mechanism for rotating one of the left and right-hand reel supports at a high speed.

What is claimed is:

1. A mode selecting mechanism for a tape recorder capable of actuating a ejector mechanism and a head moving mechanism by utlizing the turning force from a tape transporting motor, which comprises:
   (a) a rotation transmitting system having a gear for transmitting the rotation of the tape transporting motor to a pair of reel supports;
   (b) a cam gear having a non-toothed section and a cam which engages with the gear in the rotation transmitting system at a position other than the non-toothed section;
   (c) a rocking lever engaged with the cam of the cam gear for performing a rocking motion which is coupled to the rotation of the cam gear;
   (d) an ejector mechanism capable of ejecting a cassette tape from the reel supports;
   (e) an electromagnet for EJECT motion capable of engaging a portion of the ejector mechanism with the rocking lever at the time of conduction and actuating the ejector mechanism by the rocking motion of the rocking lever;
   (f) a head moving mechanism capable of moving a magnetic head into PLAY position against the tension of a head-return spring; and
   (g) an electromagnet for PLAY motion capable of engaging the head moving mechanism with the rocking lever and moving the head moving mechanism to the operative position by the rocking motion of the rocking lever, and holding the head moving mechanism at PLAY position at the time of conduction;

wherein the non-toothed section of the cam gear is engaged with the gear in the rotation transmitting system when the rotation of the cam gear causes the head moving mechanism to be in the operative position, and when the electromagnet for PLAY is turned off, the return force of the head moving mechanism is transmitted via the rocking lever to the cam gear to enable the cam gear to mesh with the gear in the rotation transmitting system.

2. A mode selecting mechanism for a tape recorder capable of actuating an ejector mechanism and a head moving mechanism by utilizing the turning force from a tape transporting motor, which comprises:
   (a) a rotation transmitting system having a gear for transmitting the rotation of the tape transporting motor to a pair of reel supports;
   (b) a cam gear having a non-toothed section and a cam which engages with the gear in the rotation transmitting system at a position other than the non-toothed section;
   (c) a head moving mechanism capable of moving a magnetic head into PLAY position against the tension of a head-return spring;
   (d) an electromagnet for PLAY motion capable of engaging the head moving mechanism with the rocking lever and moving the head moving mechanism to the operative position by the rocking motion of the rocking lever, and holding the head moving mechanism at PLAY position at the time of conduction;
   (e) an electromagnet for FAST FORWARD motion;
   (f) an electromagnet for REWIND motion;
   (g) a member capable of changing tape traveling direction, the member being operatively connected to the electromagnet for FAST FORWARD motion and the electromagnet for REVERSE motion, and normally positioned in a neutral position so as to allow travel into the position for FAST FORWARD motion or REVERSE motion;
   (h) a rotatable member rotatably supported by the member capable of changing tape traveling direction so as to move with the member, and thereby be rotated in a predetermined direction according to position by means of the head moving mechanism; and
   (i) a high-speed rotation transmitting mechanism operatively connected to the rotatable member and capable of transmitting the turning force of the tape transporting motor to one of the reel supports;

wherein the non-toothed section of the cam gear is engaged with the gear in the rotation transmitting system when the rotation of the cam gear causes the head moving mechanism to be in the operative position, and when the electromagnet for PLAY motion is turned off, the return force of the head moving mechanism is transmitted via the rocking lever to the cam gear to enable the cam gear to mesh with the gear in the rotation transmitting system.

* * * * *